(12) United States Patent
Lehn et al.

(10) Patent No.: US 12,370,910 B2
(45) Date of Patent: *Jul. 29, 2025

(54) SYSTEMS AND METHODS FOR CONSTANT CURRENT FAST CHARGING OF ELECTRIC VEHICLES

(71) Applicants: THE GOVERNING COUNCIL OF THE UNIVERSITY OF TORONTO, Toronto (CA); ELEAPPOWER LTD., Toronto (CA)

(72) Inventors: Peter Waldemar Lehn, Toronto (CA); Ruoyun Shi, Toronto (CA); Theodore Soong, Toronto (CA)

(73) Assignees: INNOVATIONS & PARTNERSHIPS OFFICE UNIVERSITY OF TORONTO, Toronto (CA); ELEAPPOWER LTD., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,510

(22) Filed: Mar. 14, 2024

(65) Prior Publication Data
US 2024/0246428 A1     Jul. 25, 2024

Related U.S. Application Data

(62) Division of application No. 16/622,794, filed as application No. PCT/CA2018/050731 on Jun. 15, 2018, now Pat. No. 11,970,067.
(Continued)

(30) Foreign Application Priority Data

Oct. 23, 2017   (CA) ..................................... 2983328

(51) Int. Cl.
*B60L 53/10*     (2019.01)
*H02J 7/14*     (2006.01)
(Continued)

(52) U.S. Cl.
CPC ............. *B60L 53/11* (2019.02); *H02J 7/1423* (2013.01); *H02J 7/345* (2013.01); *H02M 3/44* (2013.01);
(Continued)

(58) Field of Classification Search
CPC ....................................................... B60L 53/11
(Continued)

(56) References Cited

U.S. PATENT DOCUMENTS 5,365,153 A * 11/1994 Fujita ..................... B60L 53/14
                                                 318/803
8,054,025 B2 * 11/2011 Oyobe ..................... H02J 7/02
                                                 180/65.21

(Continued)

OTHER PUBLICATIONS

United States Patent & Trademark Office (USPTO), Non Final Rejection to U.S. Appl. No. 16/622,794, filed Mar. 16, 2022.
United States Patent & Trademark Office (USPTO), Final Rejection to U.S. Appl. No. 16/622,794, filed Jan. 5, 2023.
European Patent Office (EPO), Communication from Examining Division to EP Application No. 18818623.3, Dec. 20, 2023.

*Primary Examiner* — Yalkew Fantu
(74) *Attorney, Agent, or Firm* — Norton Rose Fulbright Canada LLP

(57) ABSTRACT

A DC charging circuit includes a first inverter module corresponding to a first battery; a second inverter module corresponding to second battery; and DC terminals tapping off a high-side of the first inverter module and a low-side of the second inverter module. A front-end switching circuit is also described. The front-end switching circuit controls charging input from a DC source to at least one inverter circuit, each inverter circuit corresponding to at least one respective battery. The front-end switching circuit is an add-on for interfacing to high voltage DC inputs.

20 Claims, 25 Drawing Sheets

Related U.S. Application Data

(60) Provisional application No. 62/607,549, filed on Dec. 19, 2017, provisional application No. 62/519,946, filed on Jun. 15, 2017.

(51) Int. Cl.
 *H02J 7/34* (2006.01)
 *H02M 3/44* (2006.01)

(52) U.S. Cl.
 CPC ....... *B60L 2210/30* (2013.01); *B60L 2210/40* (2013.01); *H02J 2310/48* (2020.01)

(58) Field of Classification Search
 USPC .......................................................... 320/137
 See application file for complete search history.

(56) References Cited

U.S. PATENT DOCUMENTS

| | | | |
|---|---|---|---|
| 11,970,067 B2* | 4/2024 | Lehn | H02J 7/1423 |
| 2008/0115985 A1* | 5/2008 | Ishikawa | B60W 10/26 |
| | | | 180/65.285 |
| 2009/0033255 A1* | 2/2009 | John | B60L 58/20 |
| | | | 318/141 |
| 2012/0062176 A1* | 3/2012 | Hasan | B60L 50/16 |
| | | | 320/109 |
| 2021/0146782 A1 | 5/2021 | Lehn et al. | |

* cited by examiner (a) Multi-phase integrated charger [5], [6]

(b) PFC boost charger [7]

(c) Integrated charger using two-wheel drive [8]

(d) Semi-integrated charger using dual inverter drive [16]

(e) Proposed integrated fast charger (a) Circuit model of upper module (b) Average model

SYSTEMS AND METHODS FOR CONSTANT CURRENT FAST CHARGING OF ELECTRIC VEHICLES

CROSS REFERENCE

This application is a divisional of U.S. application Ser. No. 16/622,794 filed on Dec. 13, 2019, which is a 371 US National Stage Application of PCT/CA2018/050731 filed on Jun. 15, 2018, which is a non-provisional of, and claims all benefit, including priority to U.S. Application No. 62/519,946, filed 15 Jun. 2017, U.S. Application No. 62/607,549, filed 19 Dec. 2017, Canadian Application No. 2983328 filed 23 Oct. 2017, all entitled "CONSTANT CURRENT FAST CHARGING OF ELECTRIC VEHICLES VIA DC GRID USING DUAL INVERTER DRIVE", all incorporated herein by reference.

FIELD

Embodiments of the present disclosure relate generally to the field of electronic charging, and some embodiments particularly relate to the field of electronic charging of vehicles.

BACKGROUND

Electric vehicles have the potential to reduce energy consumption in the transportation sector which covers 27% of the total global consumption [1]. With their rapid deployment in the near future, consumers will expect greater drive range and fast charging rates. AC level 1 & 2, and DC charging are the presently available charging methods. DC charging is an attractive option over AC level 1 or 2 charging due to its potential to fully charge the electric vehicle in less than an hour [2]. The International Electrotechnical Commission (IEC) has established standardized connector protocols (CHAdeMO, Combined Charging System, etc.) that can be interfaced with charging systems fed by AC or DC mains [3].

Existing fast chargers require the electric vehicle supply equipment (EVSE) to be installed off-board due to physical size and mass limitations of the vehicle. The EVSE typically consists of a rectifier, LC filter, and high-power dc/dc converter. Unlike AC level charging units ($200-$300/KW), DC fast ($400/KW) are more costly in comparison due to increasing power level and system complexity [4]. Components rated for higher amperage contribute to the cost increase. Thus, lower component count and charger complexity are preferred.

SUMMARY

Existing integrated chargers are configured to charge from single or three-phase AC networks. With the rapid emergence of DC grids, there is growing interest in the development of high-efficiency, low-cost integrated chargers interfaced with DC power outlets. This application describes a new integrated charger which in some embodiments may offer electric vehicle fast charging from emerging DC distribution networks. In absence of a DC grid, the charger can alternatively be fed from a simple uncontrolled rectifier. The proposed charger leverages the dual inverter topology previously developed for high-speed drive applications. By connecting the charger inlet to the differential ends of the traction inverters, charging is enabled for a wide battery voltage range previously unattainable using an integrated charger based on the single traction drive. An 11 KW experimental setup demonstrates rapid charging using constant current control and energy balancing of dual storage media. To minimize the harmonic impact of the charger on the DC distribution network, a combination of complementary and interleaved switching methods is demonstrated.

In accordance with one aspect, there is provided a DC charging circuit including: a first inverter module corresponding to a first battery; a second inverter module corresponding to second battery; and DC terminals tapping off a high-side of the first inverter module and a low-side of the second inverter module.

In accordance with another aspect, there is provided an optional front-end switching circuit for controlling charging input from a DC source to at least one inverter circuit, each inverter circuit corresponding to at least one respective battery. The optional front-end switching circuit is an add-on for interfacing to high voltage DC inputs.

In particular, the front-end switching circuit can be used for connecting the DC charging circuit to a high voltage DC network. The front-end switching circuit includes: a switching device which when positioned in series with the at least one inverter circuit and the DC source, the switching device controls the charging input provided to the at least one respective battery, the switching device controllable in conjunction with switches in the at least one inverter circuit based on at least one voltage of the at least one respective battery.

In an aspect, there is provided a DC charging circuit comprising a first inverter module corresponding to a first battery; a second inverter module corresponding to second battery; and DC terminals tapping off a high-side of the first inverter module and a low-side of the second inverter module.

In another aspect, the first inverter module and the second inverter module each comprise a set of three half-bridge switch networks connected in a cascaded manner with the DC terminals and the first and second batteries.

In another aspect, the method includes controlling the switch networks with complementary switching of switches between the first inverter module and the second inverter module.

In another aspect, the method includes controlling the switch networks with interleaved switching between parallel phases.

In another aspect, the method includes controlling power distribution between the first inverter module and second inverter module to balance energy between battery modules.

In another aspect, the first inverter module and the second inverter modules are coupled to an electric motor is mounted in a vehicle and the electric motor is configured for dual-mode operation comprising a first mode wherein the electric motor provides the drive functionality to impart forces to move the vehicle, and a second mode wherein the electric motor provides the charging functionality when electrically coupled to the power source.

In another aspect, the circuit includes a gating signal controller configured for providing fault blocking capability at the DC source, protecting the on-board batteries in the event of a DC-side fault.

In another aspect, the DC terminals connect at a differential connection of a traction system comprising the first inverter module and the second inverter module.

In another aspect, the DC charging circuit is configured for rapid charging of the first battery and the second battery free of a standalone charger.

In another aspect, the DC charging circuit is configured for charging of the first battery and the second battery when at least one of the first battery and the second battery are at a low state of charge.

In another aspect, the first battery and the second battery are EV battery packs consisting of n-strings.

In another aspect, the first battery and the second battery include evenly split pairs of 2-level voltage source inverters.

In another aspect, the first battery and the second battery include battery strings having a same number of cells per string, maintaining a same nominal voltage as a combination of the first battery and the second battery.

In another aspect, AC terminals of each of the first inverter module and the second inverter module are coupled to open-ended windings of an electric motor such that machine leakage inductance is shared between the first inverter module and the second inverter module.

In another aspect, each of the first inverter module and the second inverter module includes at least a set of half-bridge switch networks.

In another aspect, each of the first inverter module and the second inverter module includes a set of 3 half-bridge switch networks.

In another aspect, each set of 3 half-bridge switch networks is coupled in a cascaded topology with a DC input and the first battery and the second battery to account for any voltage mismatch.

In another aspect, the first inverter module and the second inverter module include a corresponding upper set of half-bridge switch networks and a corresponding lower set of half-bridge switch networks.

In another aspect, the upper set of half-bridge switch networks and the lower set of half-bridge switch networks have a phase shift of 180 degrees.

In another aspect, parallel phases of signals of the upper set of half-bridge switch networks and the lower set of half-bridge switch networks have a phase shift of 120 degrees.

In another aspect, the upper set of half-bridge switch networks and the lower set of half-bridge switch networks have a phase shift of 180 degrees; and parallel phases of signals of the upper set of half-bridge switch networks and the lower set of half-bridge switch networks have a phase shift of 120 degrees.

In another aspect, there is provided front-end switching circuit for controlling charging input from a DC source to at least one inverter circuit, each inverter circuit corresponding to at least one respective battery, the front-end switching circuit comprising: a switching device which when positioned in series with the at least one inverter circuit and the DC source, the switching device configured to control the charging input provided to the at least one respective battery, the switching device controllable in conjunction with switches in the at least one inverter circuit based on at least one voltage of the at least one respective battery.

In another aspect, the circuit is configured to control charging input from the DC source to a first inverter circuit corresponding to a first battery and a second inverter circuit corresponding to a second battery; wherein when a sum of the voltages of the first battery and the second battery are less than an input voltage of the DC source, the switching device is configured to control the charging input by operating in a first mode; and when the sum of the voltages of the first battery and the second battery are greater than the input voltage of the DC source, the switching device is configured to control the charging input by operating in a second mode.

In another aspect, in the first mode, the switching device is modulated while switches in the first and second inverter circuits enabling charging of the first and second battery are on.

In another aspect, in the first mode, the switching device is on while switches in the first and second inverter circuits enabling charging of the first and second battery are modulated.

In another aspect, in the first mode, the switching device is modulated with a duty cycle equal to or less than the sum of the voltages of the first battery and the second battery divided by the input voltage of the DC source.

In another aspect, in the second mode, the switching device is on while switches in the first and second inverter circuits enabling charging of the first and second battery are modulated.

In another aspect, the switching device has bi-directional current conduction and uni-polar voltage blocking capability.

In another aspect, the front end circuit includes comprising an input filter, and a device like a diode that has uni-directional current conducting and uni-polar voltage blocking capability in parallel with the at least one inverter circuit.

In another aspect, a controller configured to generate signals for controlling the switching device in conjunction with switches in the at least one inverter circuit.

In another aspect, the circuit includes fault blocking capability at the DC source, thereby protecting the on-board batteries in the event of a DC-side fault.

In another aspect, a method is provided for controlling charging input from a DC source to at least one inverter circuit, each inverter circuit corresponding to at least one respective battery, the method comprising: controlling a switching device, positioned in series with the at least one inverter circuit and the DC source, in conjunction with switches in the at least one inverter circuit based on at least one voltage of the at least one respective battery.

In another aspect, the switching device is positioned to control a charging input from the DC source to a first inverter circuit corresponding to a first battery and a second inverter circuit corresponding to a second battery, the method comprising: when a sum of the voltages of the first battery and the second battery are less than an input voltage of the DC source, controlling the switching device to operate in a first mode; and when the sum of the voltages of the first battery and the second battery are greater than the input voltage of the DC source, controlling the switching device to operate in a second mode.

In another aspect, controlling the switching device to operate in the first mode comprises modulating the switching device while switches in the first and second inverter circuits enabling charging of the first and second battery are on.

In another aspect, controlling the switching device to operate in the first mode comprises turning on the switching device while switches in the first and second inverter circuits enabling charging of the first and second battery are modulated.

In another aspect, comprising in the first mode, modulating the switching device with a duty cycle equal to or less than the sum of the voltages of the first battery and the second battery divided by the input voltage of the DC source.

In another aspect, the first energy storage device is a battery and the second energy storage device is a battery.

In another aspect, the first energy storage device is a battery and the second energy storage device is of a different type of energy storage device In another aspect, the second energy storage device is a supercapacitor.

DESCRIPTION OF THE FIGURES

Reference will now be made to the drawings, which show by way of example embodiments of the present disclosure.

FIG. 12A shows a circuit diagram and FIG. 23B shows an experimental setup.

FIG. 14A is a current waveform, and FIG. 14B is a Fourier spectrum of current ripple.

DESCRIPTION OF EXAMPLE EMBODIMENTS

Figure 1:
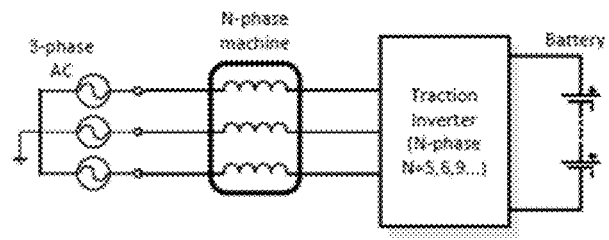
FIG. 1 shows five different examples of charger topologies (a)-(e).
Figure 1:
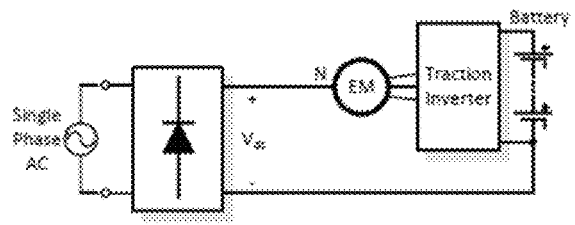
Figure 1:
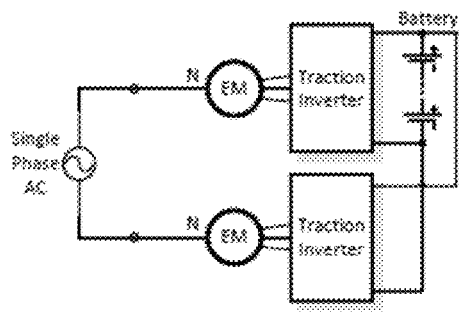
Figure 1:
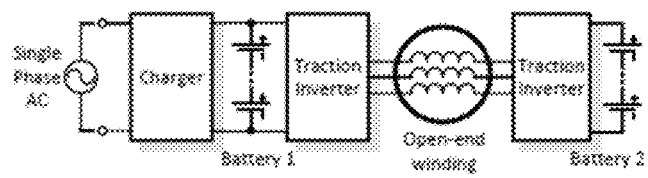
Figure 1:
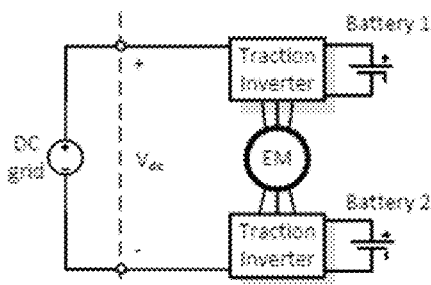

To address charger complexity, combined traction and charging systems have been studied extensively in the past decade. The concept is to configure on-board traction components for charging, thus eliminating or greatly reducing the complexity of battery chargers. Subotic et al. proposed an integrated charger based on a 9-phase traction system [5]. As shown in FIG. 1(a), the machine's neutral points can be directly connected to a three-phase AC input, thus requiring no additional hardware between the AC grid and traction system. This topology also produces no net torque for vehicle propulsion in the charging process. Other multiphase machines for integrated charging are summarized in [6]. In terms of integrated charging via single-phase AC systems, FIG. 1(b) shows the topology proposed by Pellegrino et al. It employs the traction system as a PFC boost converter, which is interfaced to a single-phase AC source via rectifier [7]. In FIG. 1(c), Tang et al. used a set of parallel-connected traction inverters and two motors to charge from a single-phase AC source and thereby eliminates the need for the rectifier [8]. In either topology, the charger requires no additional dc/dc converters, thus addressing weight, volume, and cost considerations of the EVSE. However, in both cases the minimum allowable battery voltage must always exceed the peak voltage of the AC mains.

The integrated chargers previously discussed are specifically for single-phase or three-phase AC systems. Due to the rapid penetration of renewables, grid-connected storage and DC-supplied loads, there is already significant effort in integrating DC micro grids within existing AC networks [9]. Ideally future EV chargers would accommodate charging from both existing DC fast chargers as well as from DC microgrid networks.

In some embodiments described herein, an integrated charger can offer, in some situations, electric vehicle fast charging from emerging DC distribution networks. It leverages the existing dual inverter drive to operate as aforementioned integrated chargers, with the added benefits of improved voltage range and harmonic performance. The dual inverter traction system may, in some situations, provide increased speed range and battery integration without use of dc/dc power converters or additional magnetic materials, thus may offer an efficient and light-weight solution attractive for electric vehicles. Although two inverters are required, there is marginal increase in cost because each inverter stage is rated for half the total processing power. The dual inverter can, in some situations, facilitate power transfer between two isolated DC sources and the open-ended windings of the motor via differential connection of two voltage source converters. From previously proposed applications of the dual inverter for all-electric vehicles, the energy source is either a split-battery pack or a battery and floating capacitor bridge [11], [12]. The dual inverter configuration may, in some situations, offer voltage boost from the secondary inverter to enable high speed operation, improved efficiency at high speed, modular battery installation, and hybrid energy storage integration [10]-[15].

A challenge associated with the dual inverter drive is the need to charge two independent batteries. Hong et. al demonstrated that a single charger could be utilized for charging both batteries [16]. Shown in FIG. 1(d), the primary battery is charged using a standalone charger, while the secondary battery is charged from the first via the traction system.

In some embodiments, the present application describes a means which may, in some instances, eliminate the standalone charger in cases where DC power network access is available. The topology can be backwards compatible to conventional DC fast charging infrastructure. The proposed charger in this work is shown in FIG. 1(e). Contrary to other integrated chargers discussed earlier, placing the DC input at the differential connection of the traction system may enable rapid charging of dual storage media without a standalone charger. The topology may address the limited voltage range in the single inverter charging systems by using the series connection of two traction inverters, thus providing charging functionality even when the battery is at low state-of-charge. While the embodiments described below focus on vehicle charging, in some embodiments, the topology can be capable of bi-directional energy exchange with an external DC power network.

In some situations, embodiments of the present application may provide: an integrated charger suited for emerging DC networks, where fast charging is enabled by direct connection to a DC source; improved input voltage range using differential connection of dual inverter topology, requiring no external hardware; and/or a switching method utilizing complementary and interleaved phase shift to improve harmonic performance compared to single inverter systems.

The new architecture may offer rapid EV charging from the emerging DC grid with the potential to reduce charger cost, weight, and complexity by integrating charging functionality into the traction system.

Topology

Figure 2:
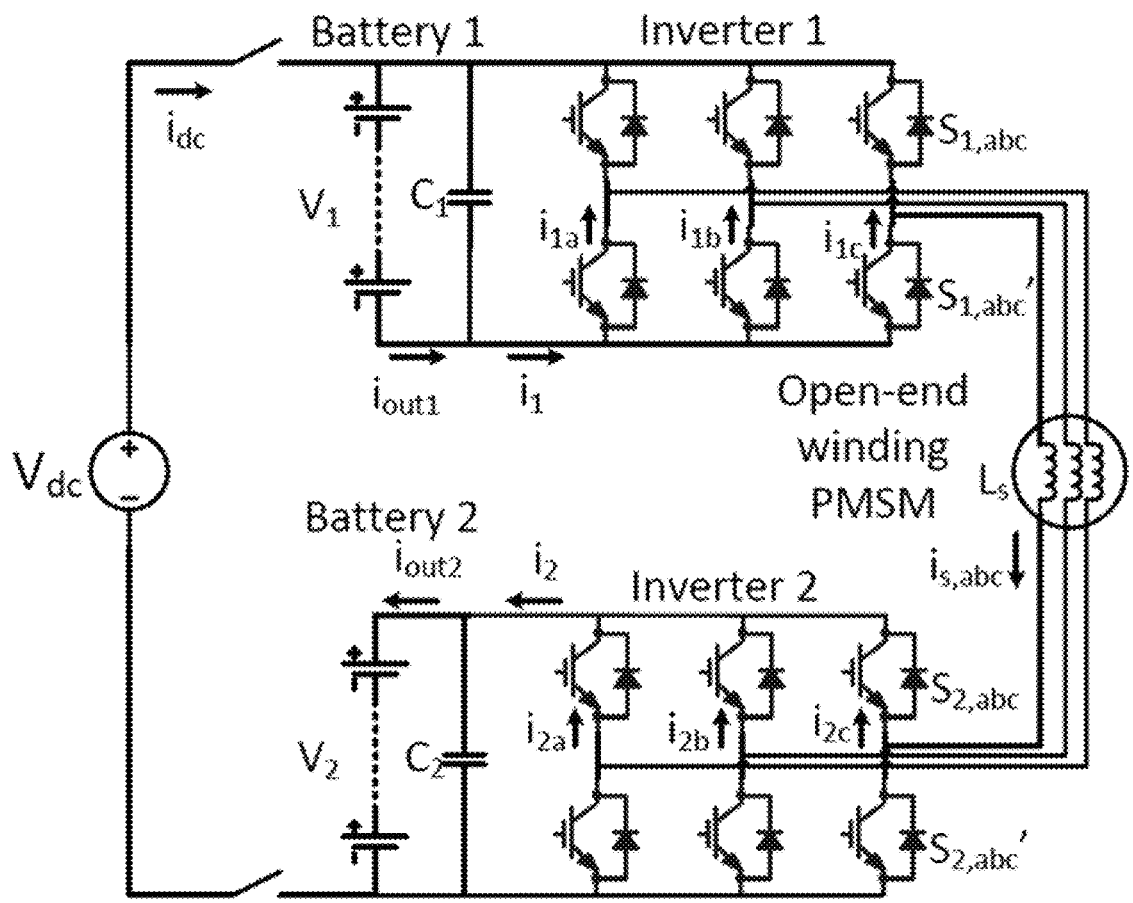
FIG. 2 shows an example dual inverter charger.

An example DC charging configuration is shown in FIG. 2. For the purpose of this paper, switches, voltage and current quantities for the upper and lower modules are labeled "1" and "2", respectively. The modules are shown as examples in the figures, and may include more, less, or alternative electronic components. Aspects of the modules and components thereof may be coupled, attached, directly connected, or indirectly connected (e.g., with one or more intermediary components). Aspects of the modules and components may also be operatively connected. The EV battery pack, consisting of n-strings, is split evenly between a pair of 2-level voltage source inverters. Each battery string has the same number of cells per string, thus maintaining the same nominal voltage as the combined battery pack. The AC side is connected to the open-ended windings of the electric motor such that the machine leakage inductance is shared between the two switch networks.

A feature of the example dual inverter drive not previously exploited is its ability to leverage differential connections for EV charging. The DC terminals tap off the high-side of module 1 and low-side of module 2. Power can be fed directly from a DC microgrid without a dc/dc intermediate stage. Each set of 3 half-bridge switch networks is connected in a cascaded manner with the DC input and batteries to account for any voltage mismatch. In addition, the dual battery pack enables doubling of the motor voltage. Unlike the single traction-based integrated charger in FIG. 1(b), this permits charging even when the voltage in each battery pack is less than the DC input voltage. This may be crucial for future trends in bulk power transfer, where fast charging stations are expected to support up to 1000 V at the vehicle inlet [3], [17].

Another potential benefit of utilizing two traction inverters is current ripple reduction. Since the motor leakage inductance, Ls, is limited by the magnetics of the EV motor, it is beneficial to minimize potentially high ripple component via controls. Thus, two types of switching methods are deployed. The combination of 180° phase shift between upper/lower cells, and 120°. interleaving between parallel phases both reduce switching ripple in $i_{dc}$, $i_{s,\,abc}$, $i_1$, and $i_2$. Complementary switching is not feasible for the integrated charger in FIG. 1(b).

Power transfer between the DC input and each battery unit is achieved by regulating the inductor currents. Its principle of operation is akin to the single string multi-port dc/dc converter developed in [18], however, the developed converter is reconfigured for 3-phase motor drives in this work.

Operation

In some embodiments, the dual inverter is configured to operate as a set of dc/dc converters in charging mode, as opposed to performing dc/ac conversion in traction mode. Its principle of operation is analyzed via the average model depicted in FIG. 3. This section also highlights the impact of complementary and interleaved switching on harmonic performance.

A. Average Model

The average model of the dual inverter is developed for identical energy storage integration, as in the case of the split-battery pack. Battery pack balancing will be addressed in Section IV. A dynamic model of the half-bridge network for a multilevel converter was developed in [19], but can also be used to represent the average switch model. Each of the six half-bridge converters is modeled as an ideal, controlled voltage source. The voltage depends on the duration in which the storage unit is inserted. The battery currents, i1 and i2, are derived from power balance. Although power flow can be bidirectional, this work identifies Vdc as the input and V1 & V2 as outputs.

In FIG. 3(a), each half-bridge is modeled as:

$$V_{1i} = d_{1i}V_1 \qquad (1)$$

$$V_{2i} = d_{2i}V_2 \qquad (2)$$

where i={a, b, c} for 3 interleaved dc/dc stages.

Only the switch network in the upper module is shown because the two inverters are identical, except $V_{2i}$ is the average voltage measured across the bottom set of switches instead of the top. As shown in (1) and (2), the duty cycle regulates the duration in which each battery voltage, $V_1$ and $V_2$, is inserted. Thus, the average voltage across each set of switches is a fraction of the associated battery voltage. Switch averaging for a single half-bridge was also discussed in [20].

Note that the following relation $$d_1 = d_{1i} \qquad (3)$$

$$d_2 = d_{2i} \qquad (4)$$

is valid for this analysis assuming identical half-bridge switch networks top and bottom.

Applying KVL to any arbitrary phase (neglecting losses), the voltage conversion ratio is $$V_{dc} = V_1 d_{1i} + V_2 d_{2i} \tag{5}$$

Assuming $d_{1i}=d_{2i}=d$ for an idealized symmetric system yields:

$$V_{dc} = (V_1 + V_2)d \tag{6a}$$

TABLE I

Switching States

| $S_{1i}'$ | $S_{2i}$ | Upper module | Lower module |
|---|---|---|---|
| on | on | insert | insert |
| on | off | insert | bypass |
| off | on | bypass | insert |
| off | off | bypass | bypass |

$$\frac{V_1 + V_2}{V_{dc}} = \frac{1}{d} \tag{6b}$$

Notice the conversion ratio is similar to that of the boost converter, suggesting $V_1+V_2 \geq V_{dc}$ to enable boost operation. This is not a limiting factor for EV charging because the charging station's DC output voltage is 60 V to 500 V [3], and each string of EV battery cells spans from 300V to 500V [21]. By assigning one battery string to each module, the minimum output voltage always exceeds the input voltage. Furthermore, the battery management system shall not permit the battery to discharge below the minimum voltage specified by the manufacturer.

Figure 3:
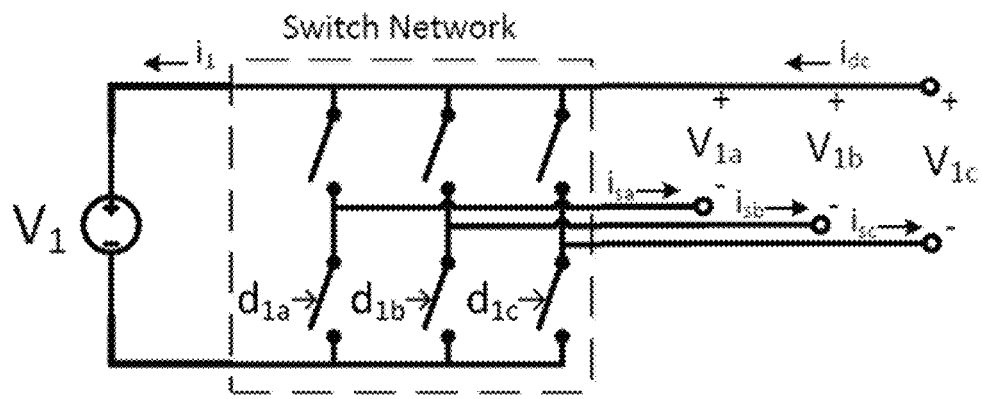
FIG. 3 shows an example circuit model of an upper module (a) and an average model of a dual inverter integrating identical DC sources. In some embodiments, switch averaging can model each of the six half-bridges as an ideal voltage source.
Figure 3:
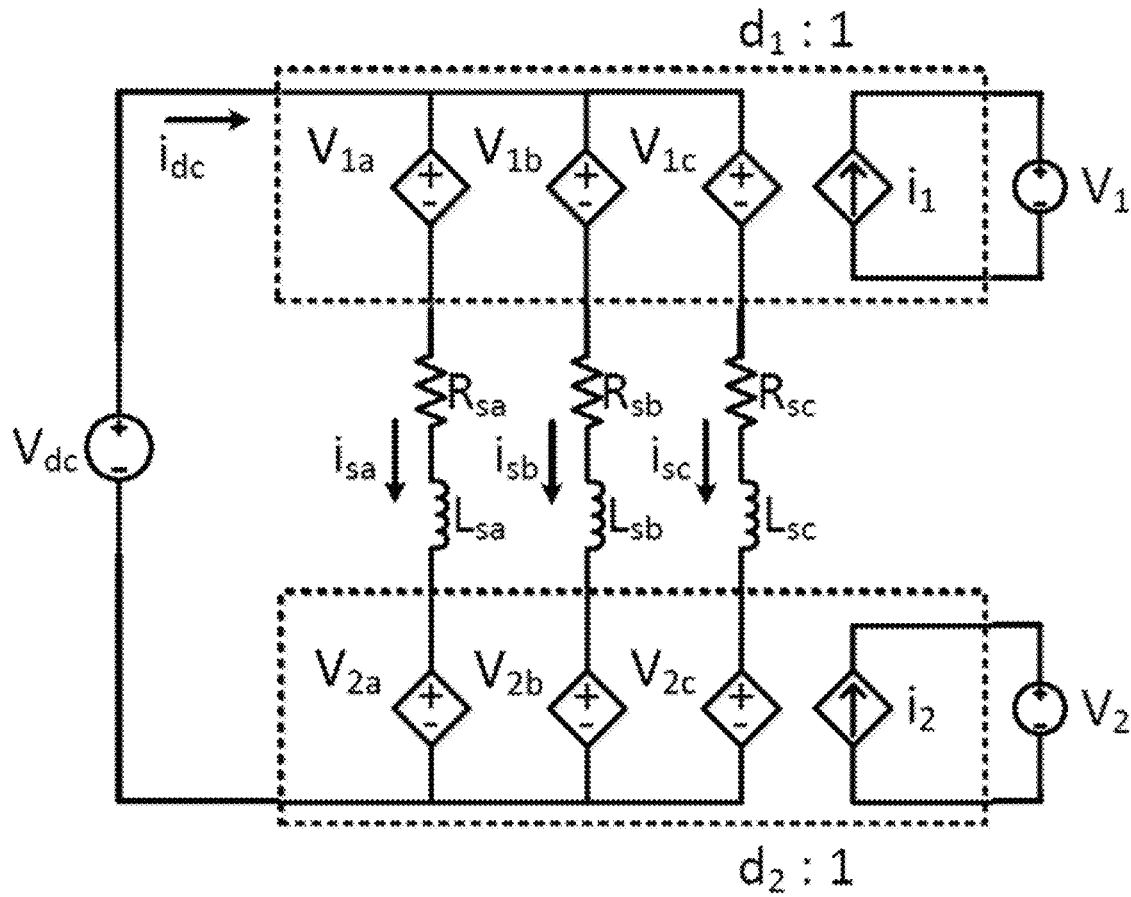

FIG. 3 also shows that the DC input current is the sum of the inductor currents:

$$i_{dc} = i_{sa} + i_{sb} + i_{sc} \tag{7}$$

Output Currents $i_1$ and $i_2$ can be Derived from Power Balance:

$$V_1 i_1 = V_1 d_1 (i_{sa} + i_{sb} + i_{sc}) \tag{8a}$$

$$i_1 = i_{dc} d_1 \tag{8b}$$

$$i_2 = i_{dc} d_2 \tag{8c}$$

where i1 and i2 are fractions of the DC input current set by the duty cycle in each module.

Using (8), the average power supplied to each battery pack is $$P_1 = V_1 i_{dc} d_1 \tag{9a}$$

$$P_2 = V_2 i_{dc} d_2 \tag{9b}$$

The average current into the battery is thus a function of the combined stator currents and duty cycle. Through proper switching action of the half-bridge switch networks, the proposed charger can effectively control the individual battery pack currents.

B. Switching Sequence

For the remainder of this paper, $d_{1i}$ and $d_{2i}$ are mapped to inner switches $S_{1i}$ and $S_{2i}$, respectively. For instance, $$S_{1a}'(t) = \begin{cases} 1, & 0 < t \leq d_{1a} T_{sw} \\ 0, & d_{1a} T_{sw} < t \leq T_{sw} \end{cases} \tag{10}$$

Figure 4:
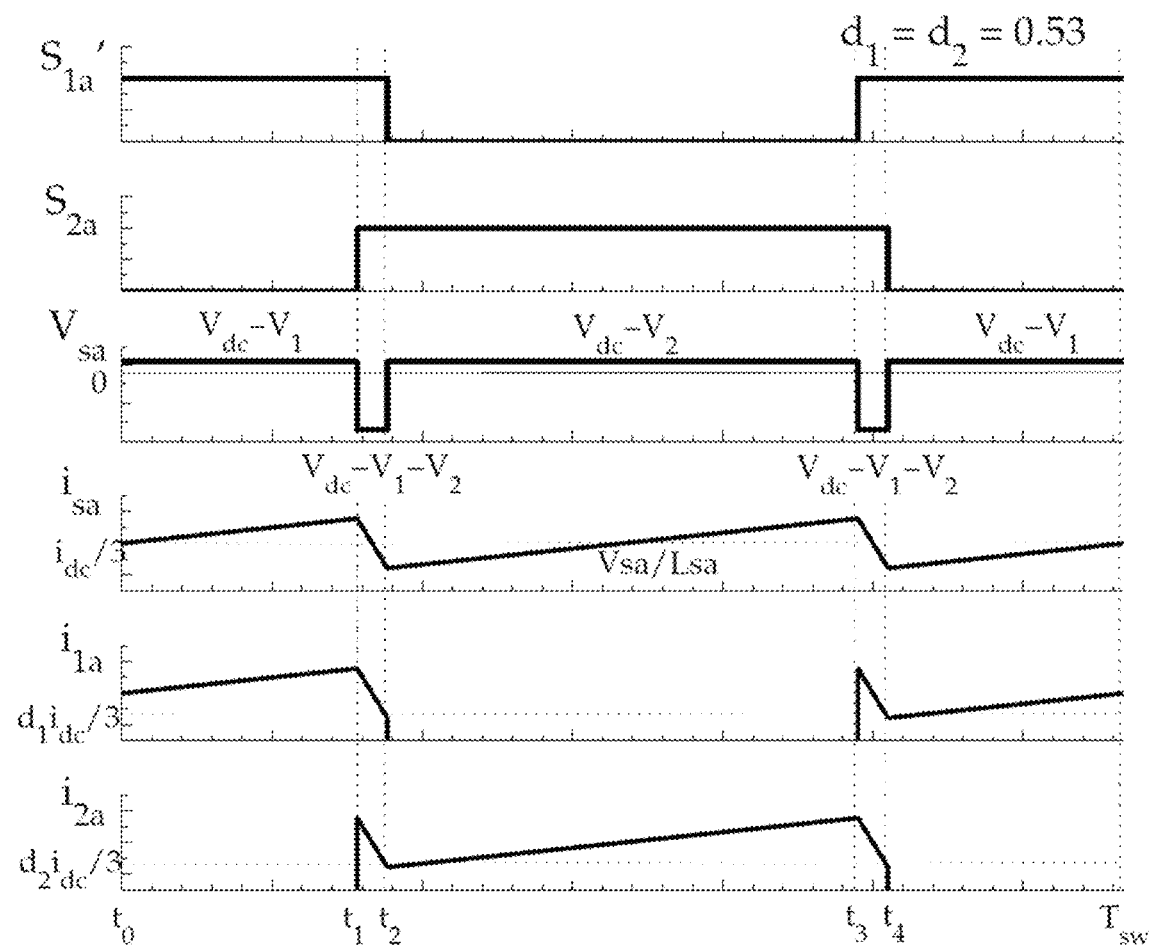
FIG. 4 shows Phase "a" voltage and current waveforms for d=0.53.

1) *Complementary switching:* A complementary strategy is applied to switches between the upper and lower modules. Thus, the following analysis examines the impact of complementary switching on phase "a". Gating signals for the inner switches, $V_{sa}$, $i_{sa}$, $i_{1a}$, and $i_{2a}$ are shown in FIG. 4. Under balanced load conditions, each pair of "inner" and "outer" switches have the same percentage on-time in one switching period. However, the gating pulses between the two modules can be phase-shifted by 180° as demonstrated in [18]. This strategic overlap of gating pulse reduces the energy variation in the inductor, resulting in half the ripple current at twice the switching frequency.

Figure 5:
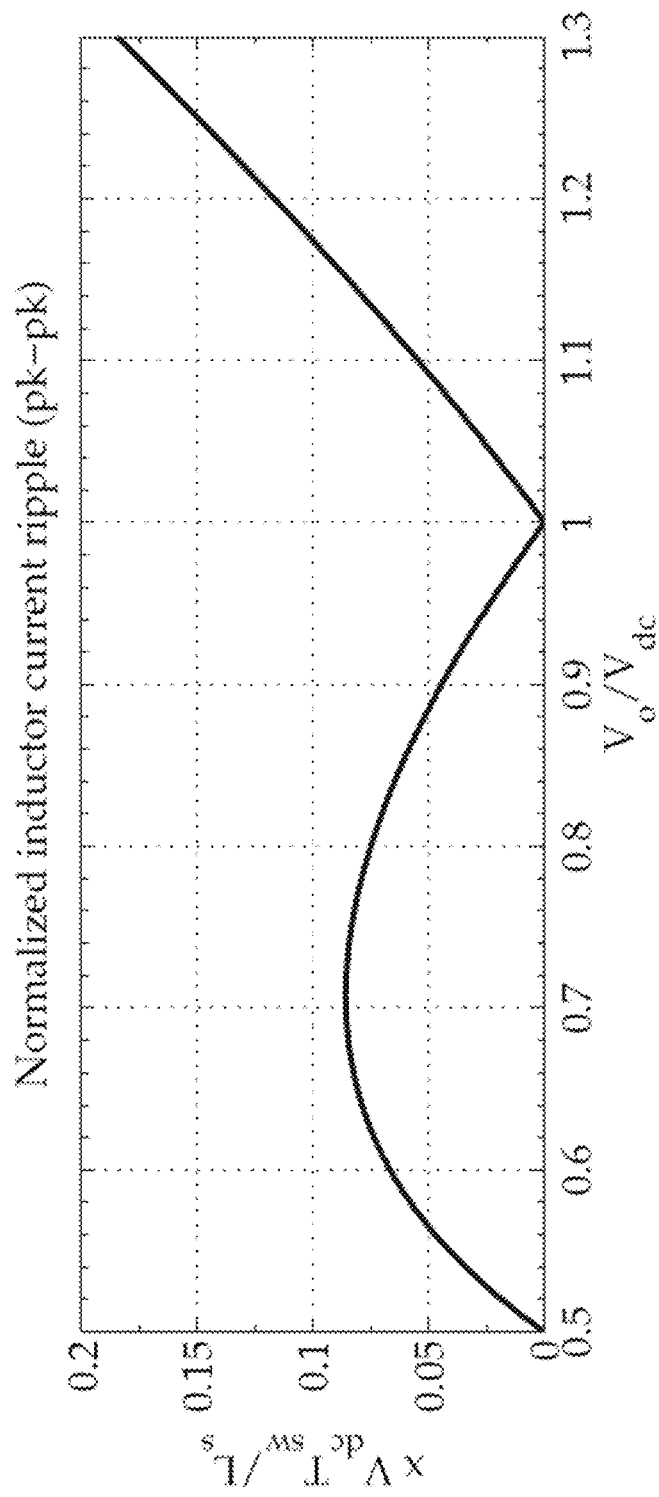
FIG. 5 shows a chart illustrating a normalized inductor current ripple. In some embodiments, inductor current ripple size varies with conversion ratio, where $V_0=V_1=V_2$. When each battery pack has nominal voltage near the input DC voltage, the operating region near 1:1 voltage ratio may achieve optimal ripple reduction.

The peak-to-peak inductor current ripple for $V_1=V_2=V$. (idealized symmetric system) is $$\Delta i_s = \frac{(V_{dc} - V_o) d' T_{sw}}{L_s} \tag{11a}$$

$$\Delta i_s = \frac{V_{dc} T_{sw}}{L_s}\left(1 - \frac{V_o}{V_{dc}}\right)\left(1 - \frac{1}{2}\frac{V_{dc}}{V_o}\right) \tag{11b}$$

where the second expression is derived by combining (6*b*) and (11*a*). Plotting (11*b*) in FIG. 5, this expression highlights one of the key features of this topology: the inductor energy variation, or current ripple, depends on the voltage difference $V_{dc}-V_o$. Notice for the case where the battery packs are balanced, and $V_1=V_2=V_{dc}$, this yields zero inductor current ripple. The ideal operating range is centered around $$\frac{V_o}{V_{dc}} = 1$$

to minimize distortion in the supply lines.

The branch current of $i_1$ and $i_2$ from any arbitrary phase, denoted by $i_{1i}$, pulsates due to the discontinuous conduction of the switch network:

$$i_{1i} = i_{si} S_{1i}' \tag{12}$$

$$i_{2i} = i_{si} S_{2i} \tag{13}$$

Notice that the inductor ripple also propagates into the battery. Since the inductor ripple is negligible relative to the pulsating current generated by summing the branch currents, complementary switching has minimal effect on the battery currents. Thus, to minimize current harmonics in the batteries, interleaved switching between parallel phases is used. The proposed switching method also reduces the switching ripple at the DC input.

Figure 6:
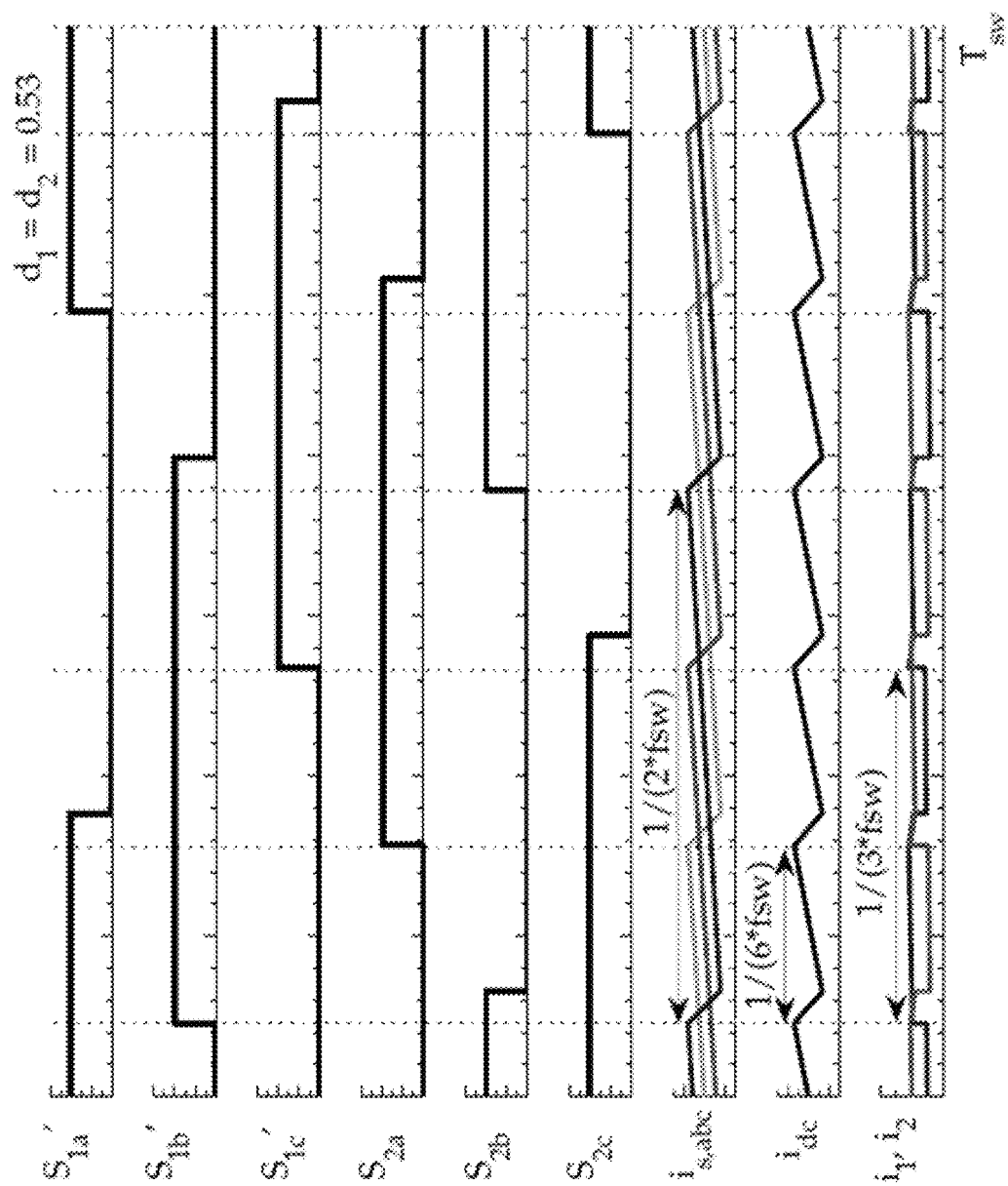
FIG. 6 shows an example complementary and interleaved switching sequence for inner switches operated at d=0.53. $d_{1i}$ and $d_{2i}$ are mapped to inner switches $S_{1i}$ and $S_{2i}$, respectively. The most significant harmonic frequencies are shown.

2) Interleaved switching: This switching strategy has not been previously studied in an integrated charger based on the dual inverter. As shown in FIG. 6, the gating pulses between phase a, b, and c are phase shifted by 120°. This further reduces the peak ripple observed in idc. Due to the phase-shift of stator currents, the peak-to-peak $i_{dc}$ is approximately ⅓ of the ripple generated using in-phase switching, and the most significant switching component is shifted to the 6th harmonic.

Figure 7:
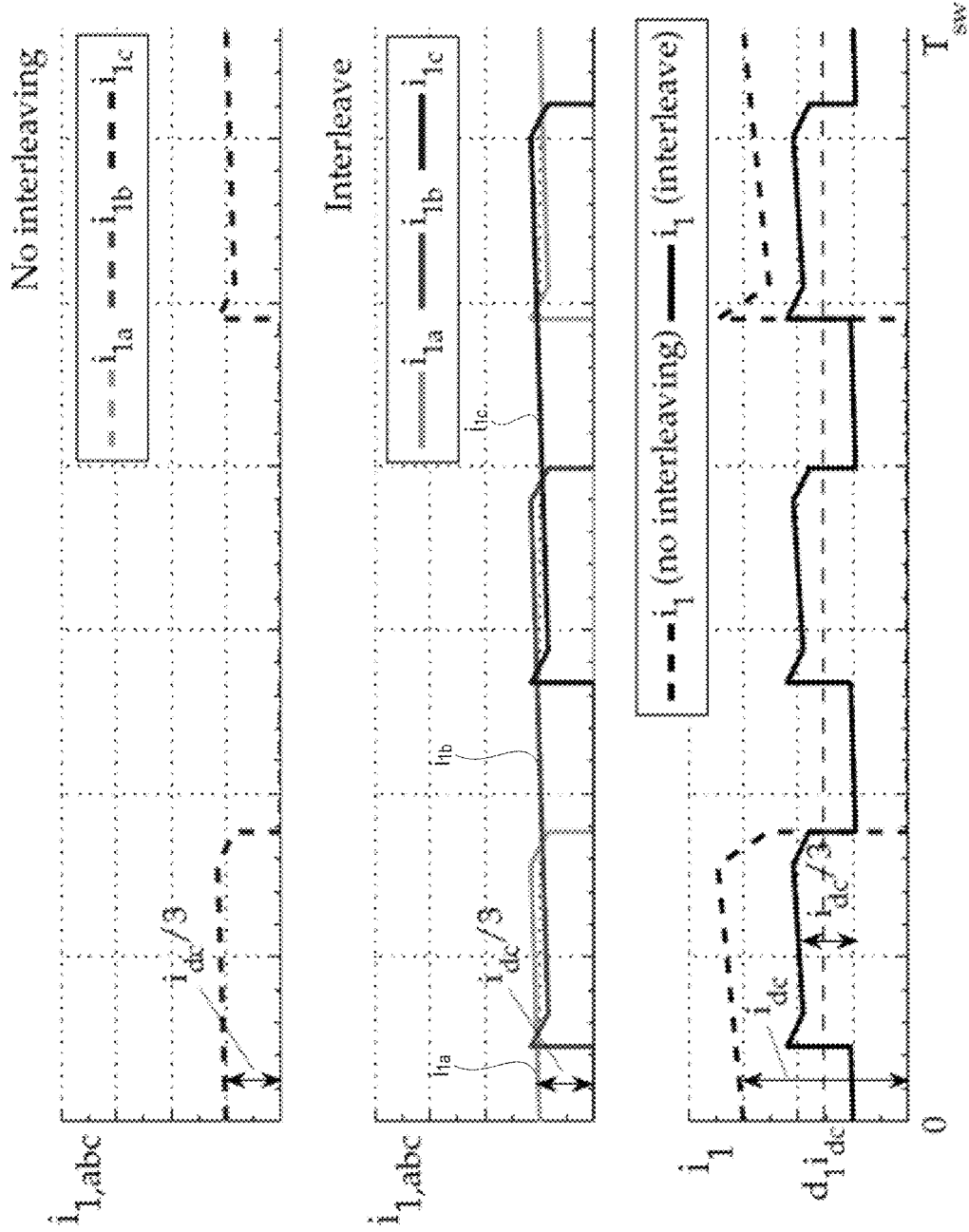
FIG. 7 shows a comparison of i1 with and without interleaved switching, at d=0.53. Phase currents in the top plot overlap when interleaving is not applied. Interleaved switching increases the ripple frequency and reduce peak-to-peak ripple.

FIG. 7 shows the impact of phase interleaving on output currents $i_1$ and $i_2$. As discussed previously, the currents in all switches are "chopped" regardless of the switching pattern. The unfiltered battery currents are the sum of the pulsating currents in the inner switches:

$$i_1 = i_{1a} + i_{1b} + i_{1c} \quad (14)$$

$$i_2 = i_{2a} + i_{2b} + i_{2c} \quad (15)$$

To minimize the switching ripple due to discontinuous conduction, interleaved switching enables continuous conduction of $i_1$ and $i_2$ for $$\frac{1}{3} < d < 1.$$

The battery currents conduct through at least one of the 3 phases. The third plot in FIG. 7 shows that at d=0.53, interleaving results in approximately of the ripple component, and the most significant harmonic is shifted to $3f_{sw}$. The contribution of the inductor current ripple to the total harmonic distortion in $i_1$ and $i_2$ is negligible at this operating point.

In summary, the proposed switching sequence produces $\Delta i_{s,abc}$, $\Delta i_{dc}$, and $\Delta i_{1,2}$ at $2f_{sw}$, $6f_{sw}$, and $3f_{sw}$, respectively. This effectively leads to reduced THD and semiconductor losses. Reduction in peak-to-peak output current ripple also helps to prevent battery capacity fade and impedance degradation [22].

Recall that an ideal, symmetrical system having balanced energy sources was studied in previous sections. This allows the controller to set equal duty cycles to both the upper and lower modules. To address the scenario where the isolated battery packs have a different state-of-charge during the charging process, the duty cycles are decomposed into sum and difference terms, defined as:

$$\begin{bmatrix} d_1 \\ d_2 \end{bmatrix} = \begin{bmatrix} \frac{1}{2} & -1 \\ \frac{1}{2} & 1 \end{bmatrix} \begin{bmatrix} \Sigma d \\ \Delta d \end{bmatrix} \quad (16)$$

In some instances, the objective of the DC charger may be to 1) regulate the DC inductor current using the sum component 2) equalize the stored energy in the split energy source using the difference component. Note that coupling between the two terms may be present.

A. Inductor Current Control

Figure 8:
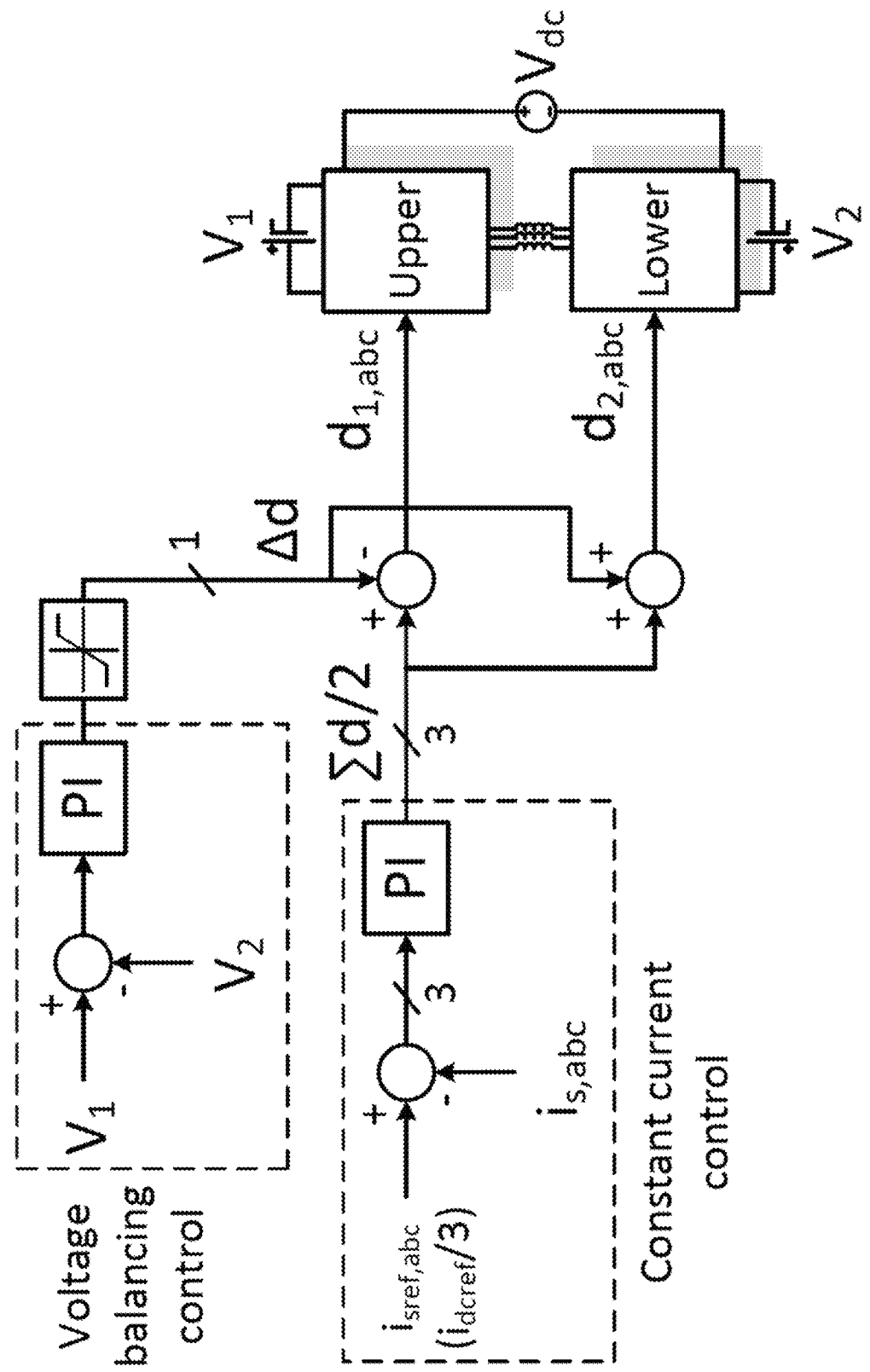
FIG. 8 shows an example control diagram for controlling current.

In FIG. 8, three PI controllers are implemented for constant current control of parallel phases. Since the EVSE typically regulates the DC current at the vehicle inlet, each inductor current will track one-third of the DC bus current reference.

An expression for the dynamics of the system is developed by applying KVL to the average model:

$$-V_{dc} + V_1 d_{1i} + V_2 d_{2i} + i_{si} R_s + L_s \frac{di_{si}}{dt} = 0 \quad (17a)$$

$$i_{si} = \frac{V_{dc} - \left(\frac{V_1 + V_2}{2}\right) \Sigma d_i + (V_1 - V_2) \Delta d_i}{R_s + sL_s} \quad (17b)$$

where $d_{1i}$ and $d_{2i}$ have been replaced by $\Sigma d$ and $\Delta d$ as per (16). Ideally, if the battery voltages are balanced, then only the sum term drives the DC current. However, the difference term is coupled to the current controller. To avoid stability issues, voltage balancing controller can be designed to have significantly slower response to voltage dynamics. Thus, $(V_1 - V_2) \Delta d_i$ can be regarded as a DC offset in the time scale of the current controller.

The example controller discussed in this work is developed for constant current charging. The control scheme for constant voltage charging may be investigated in future works.

B. Energy Balancing

In FIG. 8, the voltage balancing controller takes the voltage difference and outputs $\Delta d$, which is then subtracted from dii and added to $d_{2i}$. Therefore, if the DC source in the upper module is overcharged relative to the lower, then the lower one will be inserted more frequently. Both sources are charged simultaneously but with an offset to shift the power distribution. To ensure this offset does not exceed the operating limits of the converter, a limiter is implemented at the output of the voltage balancing controller. Note that the balancing controller uses voltage to extrapolate the total stored energy in the DC source. Other parameters may be used for energy management, such as comparing state-of charge (Coulomb count) of a split-battery pack.

Simulation Results

Figure 12A:
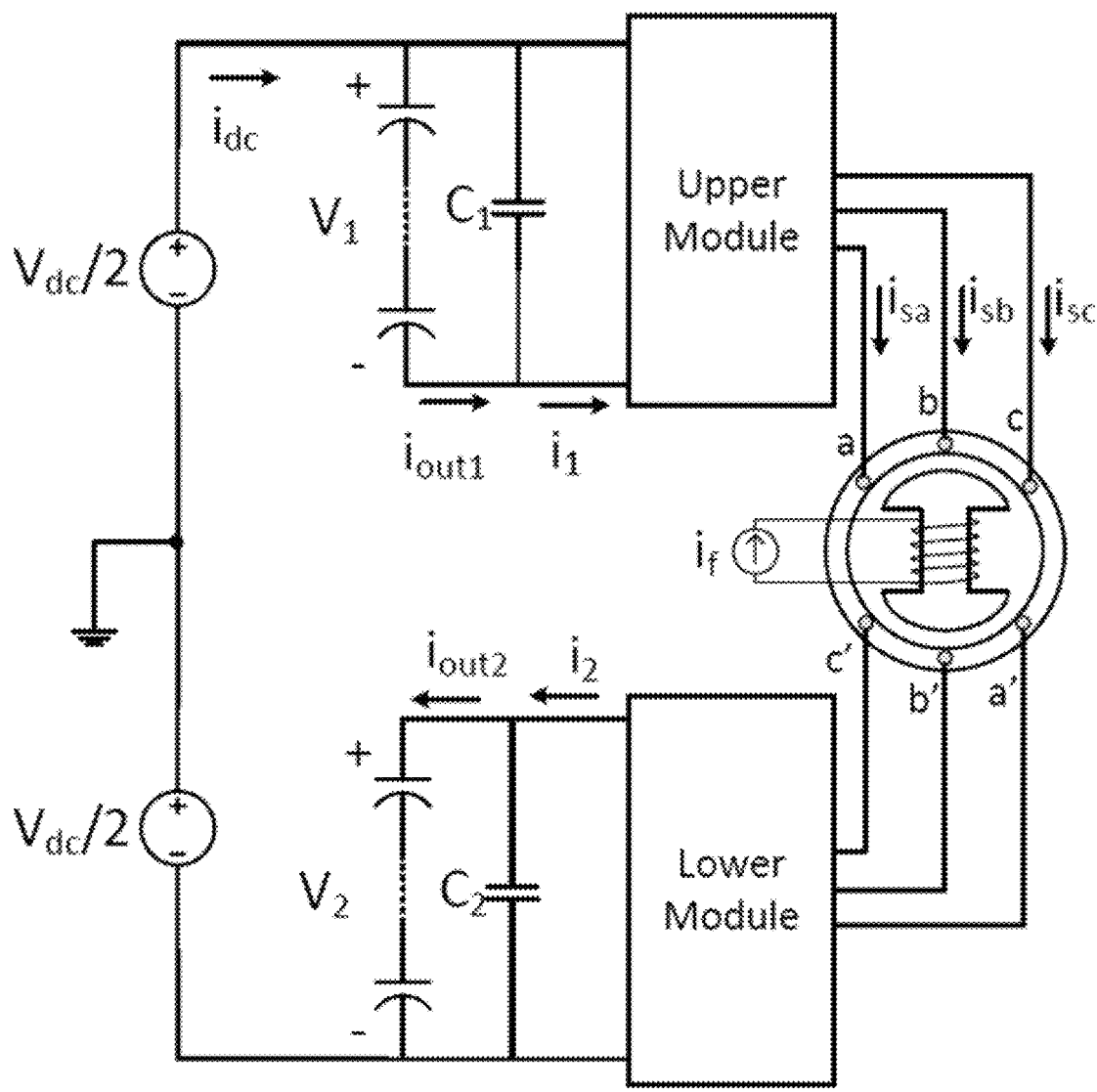
FIGS. 12A and 12B show an example laboratory prototype of 11 kW dual inverter charger with a salient-pole rotor mimicking a permanent-magnet rotor.

A full-switch model of the proposed integrated charger is implemented in MATLAB/SIMULINK with a PLECS toolbox. The circuit diagram is shown in FIG. 12(a), and simulation parameters are listed in Table II.

TABLE II

Simulation Parameters

| Parameter | Symbol | Value |
|---|---|---|
| Input power | $P_{dc}$ | 50 kW |
| Power/module | $P_1, P_2$ | 25 kW |
| DC bus voltage | $V_{dc}$ | 380 V |
| Initial SC voltage | $V_1, V_2$ | 360 V-365 V |
| DC bus current | $i_{dc}$ | 132 A |
| Stator current | $i_{s,abc}$ | 44 A |
| Capacitance/SC bank | $C_{sc1}, C_{sc2}$ | 16.6 F |
| Output capacitors | $C_1, C_2$ | 9.6 mF |
| Stator inductance | $L_s$ | 0.8 mH |
| Stator resistance | $R_s$ | 0.3 Ω |
| Switching frequency | $f_{sw}$ | 7.5 kHz |

In place of EV batteries, two supercapacitor banks are used in this simulation study to mirror the experimental system. The faster charge/discharge rates of the supercapacitor vs. a battery facilitates a less time consuming study of storage energy balancing algorithms. All current quantities are positive in the direction indicated by the arrow, which shows power transfer from the DC input to supercapacitors. This simulation study demonstrates Current control and voltage balancing functionality
DC charging at operating point V1<Vdc, V2<Vdc, which is one limitation of previously proposed integrated chargers
Current ripple reduction using proposed switching method

TABLE III

Experimental Parameters

| General Parameters | Symbol | Value |
|---|---|---|
| Input power | $P_{dc}$ | 10.35 kW |
| Power/module | $P_1, P_2$ | 5.17 kW |
| DC bus voltage | $V_{dc}$ | 230 V |
| Case #1: $V_1 < V_{dc}, V_2 < V_{dc}$ Initial SC voltage | $V_1, V_2$ | 175 V |
| Case #2: $V_1 > V_{dc}, V_2 > V_{dc}$ Initial SC voltage | $V_1, V_2$ | 245 V |
| DC bus current | $i_{dc}$ | 45 A |
| Stator current | $i_{s,abc}$ | 15 A |
| Capacitance/SC bank | $C_{sc1}, C_{sc2}$ | 16.6 F |
| Output capacitors | $C_1, C_2$ | 9.6 mF |
| Switching frequency | $f_{sw}$ | 7.5 kHz |

| Machine Parameters | Symbol | Value |
|---|---|---|
| Power | $P_{rated}$ | 11 kW |
| Line-to-line voltage | $V_{rated}$ | 220 V |
| Line current | $i_{rated}$ | 39.4 A |
| Stator inductance | $L_s$ | 0.5 mH |
| Stator resistance | $R_s$ | 0.3 Ω |
| Rotor excitation current | $i_f$ | 5 A |

Figure 9:
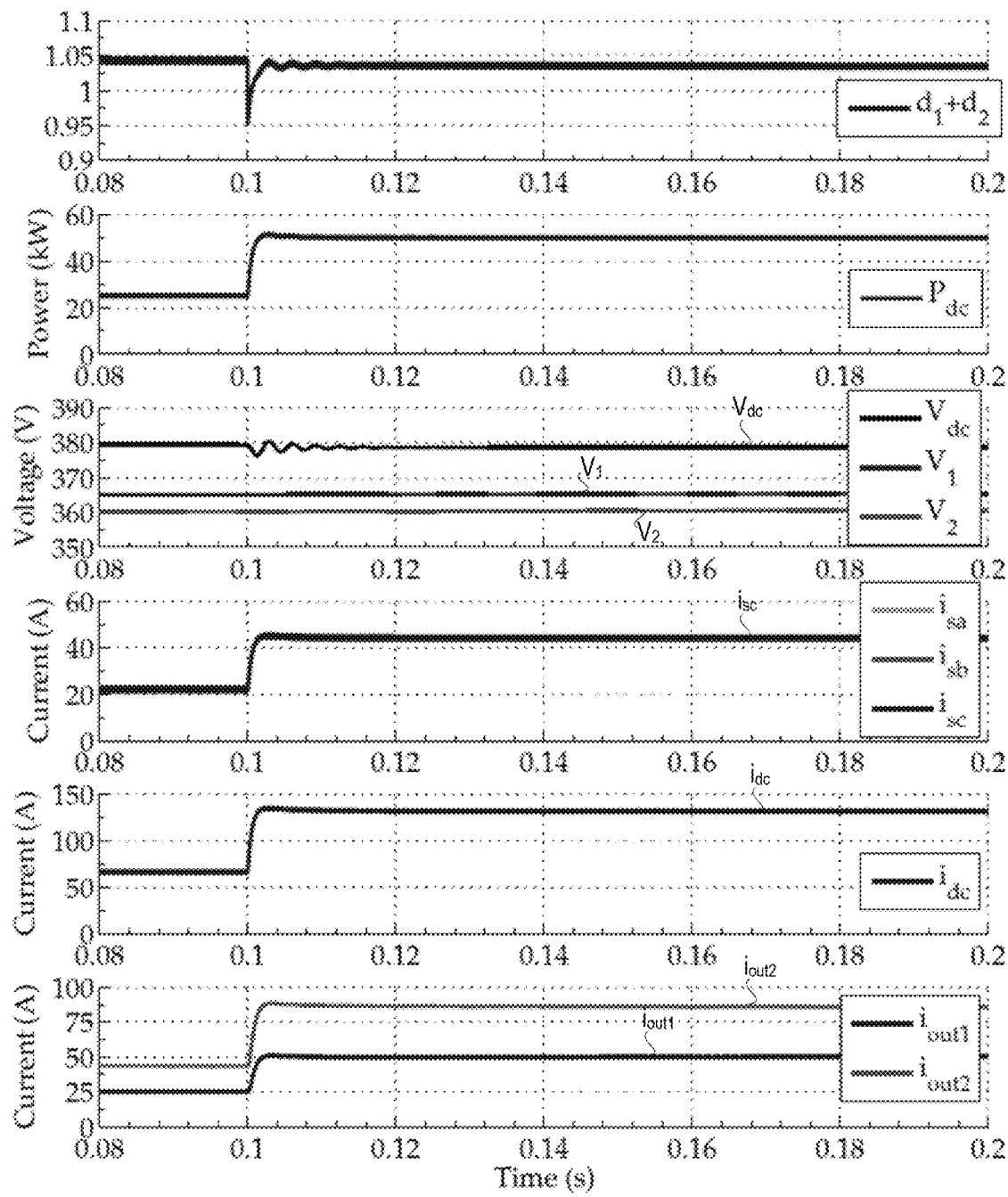
FIG. 9 shows example simulation results of constant current control with $i_{sref}$ step from 22 A to 44 A. Difference between $i_{out1}$ and $i_{out2}$ is due to voltage balancing controller acting on voltage mismatch.

1) Constant current control: FIG. 9 shows the system response when a current step is applied at t=0.1 s. The inductor reference current, $i_{sref}$, is stepped from 22 A to 44 A. This allows the total input power, DC bus current, and current into the supercapacitors to double accordingly. Σd initially drops, as derived in (17b), to act on the increase in current demand and settles to its new value in 10 ms. After the transient, the charger operates at rated conditions (50 KW), which is the typical system rating for the CHAdeMO EVSE [23].

Figure 10:
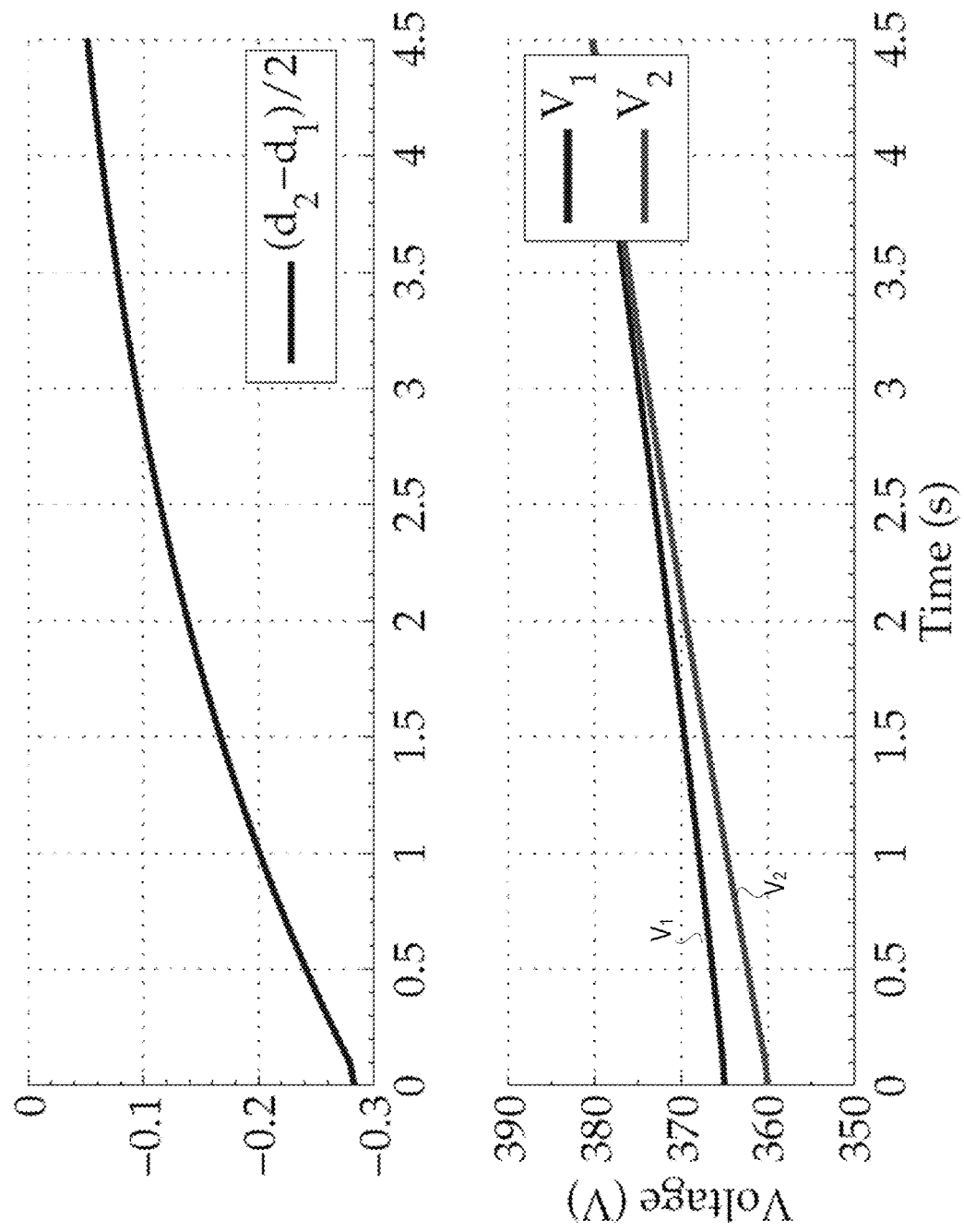
FIG. 10 shows example simulation results of voltage balancing control. V1 and V2 have a 7V deviation at t=0.

2) Voltage balancing: FIG. 10 demonstrates the effect of voltage balancing control on energy distribution. The super-capacitor banks have a 7 V difference at t=0, and achieves energy balance when V1=V2. The delta term, Δd, regulates the rate of convergence. The voltage balancing response can also be observed in FIG. 9, where iout1 and iout2 are regulated such that P1=18 KW and P2=32 kW. If supercapacitors are balanced, then Δd=0 to deliver 25 KW to each module.

Figure 11:
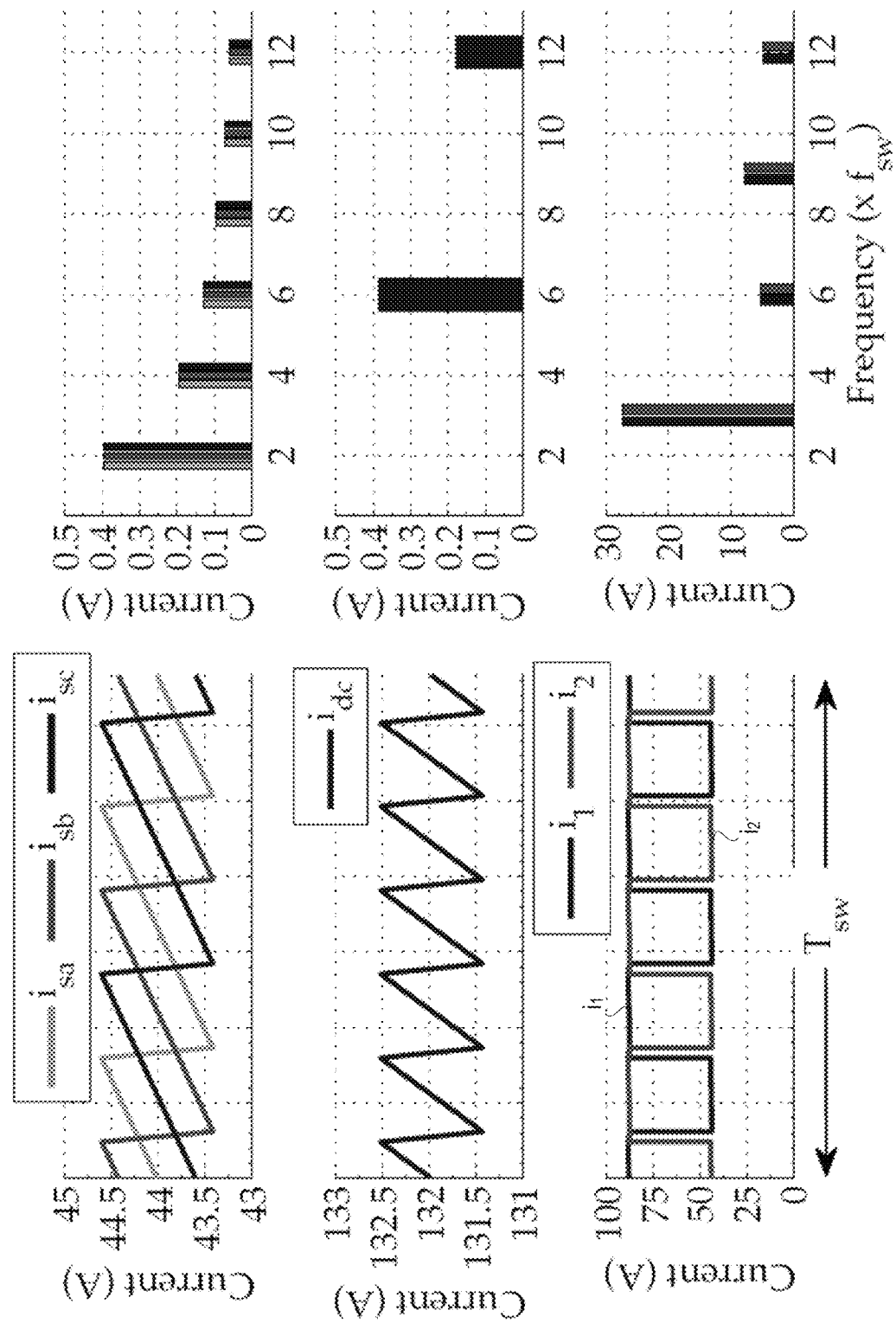
FIG. 11 shows example simulation results of switching ripple in $i_{s,abc}$, $i_{dc}$, $i_1$, and $i_2$, showing cancellation of most significant harmonic(s).

3) Harmonic analysis: FIG. 11 verifies the harmonic decomposition of is,abc, $i_{dc}$, $i_1$, and $i_2$ for the balanced voltage operating scenario. The most significant harmonic frequencies in the inductors, DC bus, and supercapacitor prior to filtering are $2f_{sw}$, $6f_{sw}$, and $3f_{sw}$, respectively. Observe that for i1 and i2, the 6th harmonic from $i_{dc}$ propagates to the output. However, it has negligible impact on output peak-to-peak ripple because the DC current is significantly larger than the inductor ripple.

Experimental Results

This section discusses experimental testing of an 11 KW laboratory prototype based on the proposed charger topology. One of the most commonly adopted DC fast chargers (CHAdeMO) is rated at 50 KW. In this work, the system rating is scaled-down to verify basic charging functionality using a dual inverter powertrain. Experimental results show constant current control, voltage balancing, and switching ripple reduction in a wide operating region. Charging at two operating points will be validated: 1) V1<Vdc, V2<Vdc, and 2) V1>Vdc, V2>Vdc. In either case, the system is operating at 94% of the rated power of the motor.

Figure 12B:
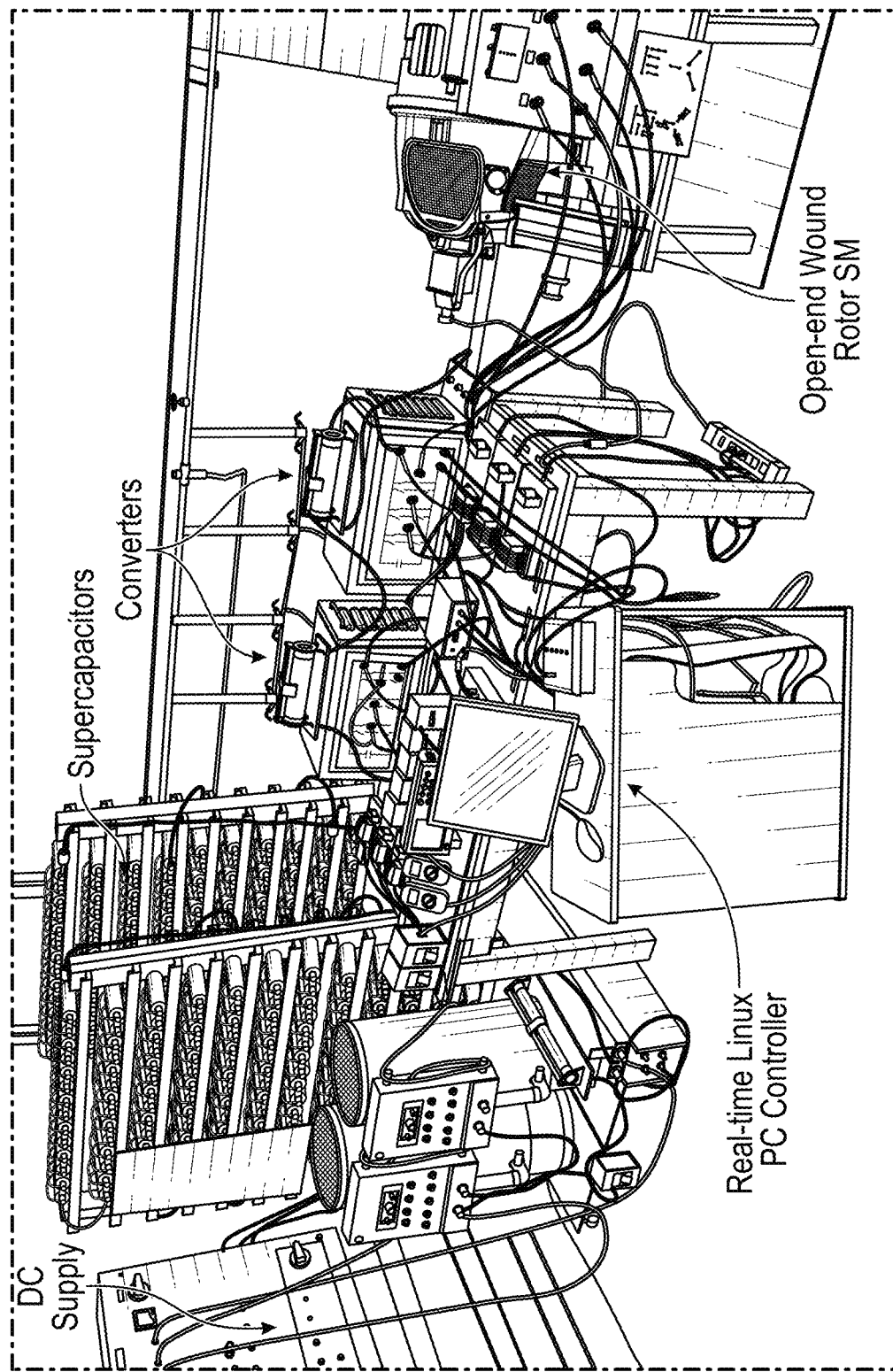

The laboratory setup is shown in FIG. 12, and system parameters in Table III. A Regatron power supply provides 230 V at the DC input, where the terminals represent the charging inlet of the vehicle. A 0.5 kWh supercapacitor bank is connected to each 2-level VSC. Each supercapacitor bank consists of 180 series-connected cells with 3000 F per cell. Thus, each string has total capacitance of 16.6 F. Permanent magnet synchronous motors (PMSM) and induction motors are the most commonly used electric motors in EVs. Thus, the wound rotor SM in the prototype is operated with constant field, similar to a PMSM. This is achieved by exciting the rotor windings to ensure rotor flux is present. The impact of rotor saliency on phase current ripple discussed below.

The control strategy in FIG. 8 can be implemented on a real-time linux PC controller with integrated FPGA.

A. Case #1: Charging at V1<Vdc, V2<Vdc

Figure 13A:
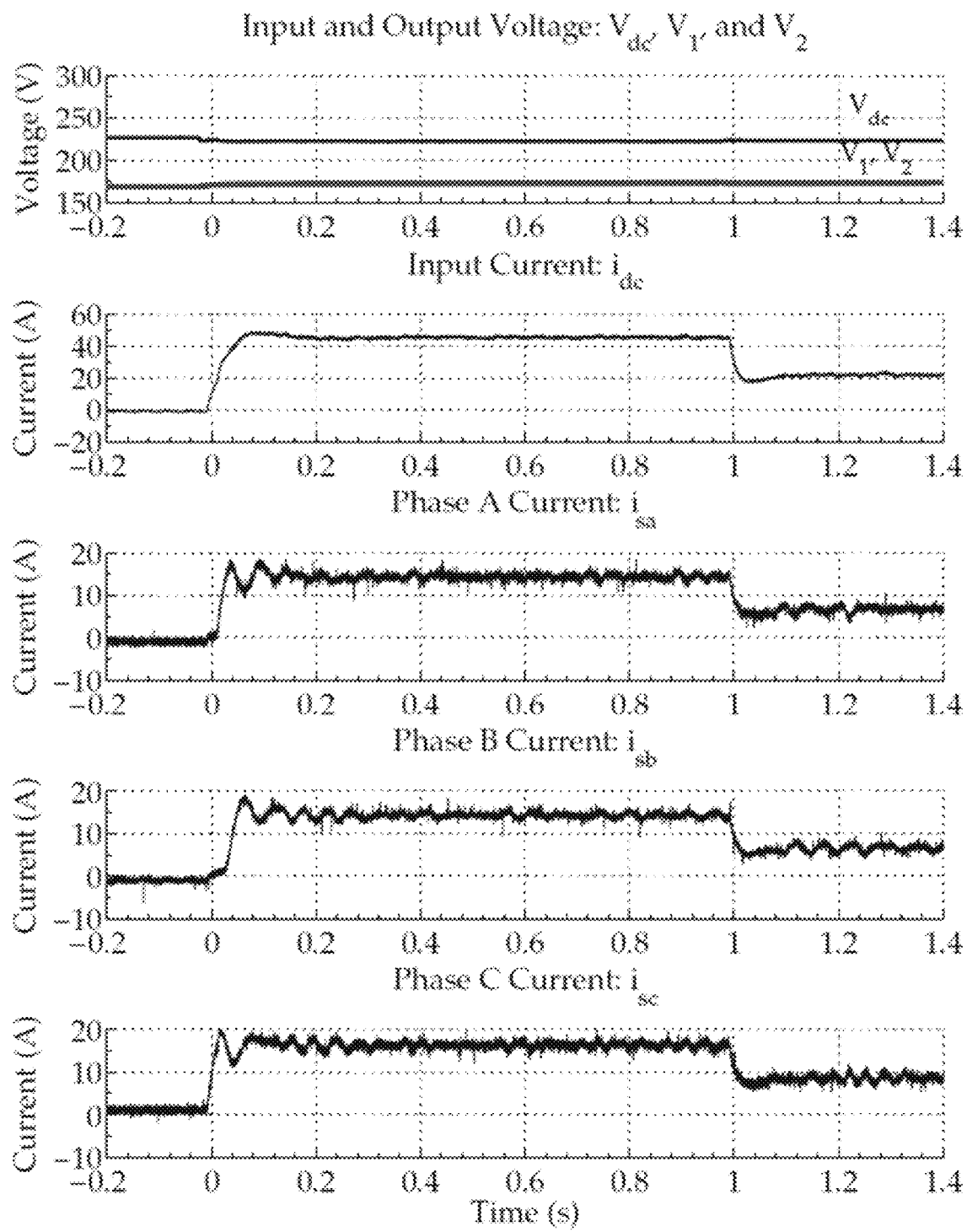
FIGS. 13A and 13B show example experimental results of constant current control at operating points (a) $V_1=V_2=175V$, $V_{dc}=230V$ and (b) $V_1=V_2=245V$, $V_{dc}=230V$. The input current is initially stepped up to its rated value (45 A), and then stepped down by 50% at t=1 s.

FIG. 13(a) shows experimental results of constant current control when each supercapacitor voltage is less than the input voltage. This is analogous to charging a high-energy, low-voltage EV battery pack, or batteries at low state-of charge. The results demonstrate functionality of the controller when isref is stepped up from 0 to 15 A, and then stepped down to 50% of its rated current. The input current is shown to be the sum of the phase currents. The combined energy storage system, with 175 V per supercapacitor bank, charges from a 230 V DC supply at 10.35 KW rated power, hence charging batteries with power comparable to rated machine power. Similar to the case presented in simulation, idc and is,abc tracks the new current reference.

B. Case #2: Charging at V1>Vdc, V2>Vdc

Figure 13B:
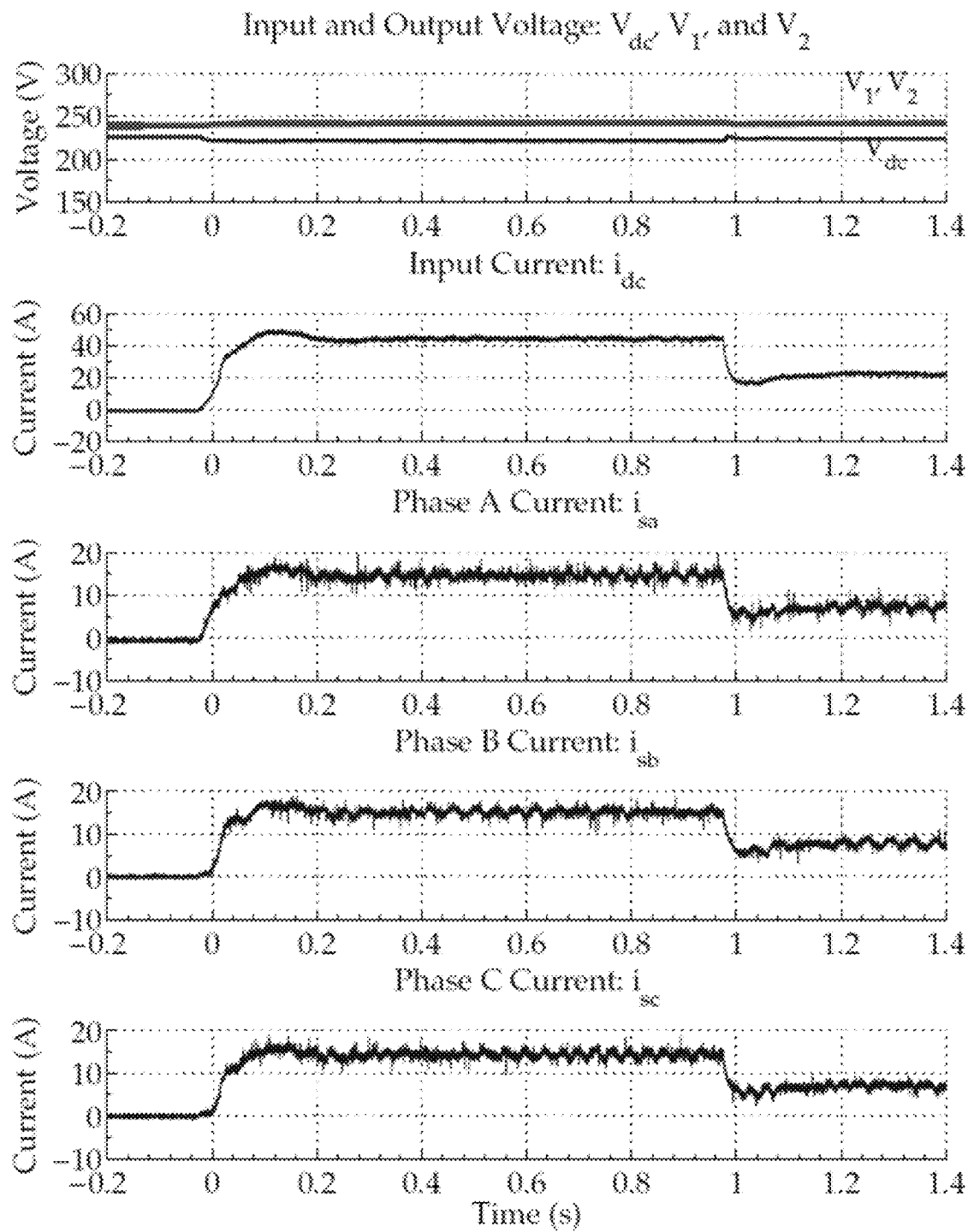
Figure 14A:
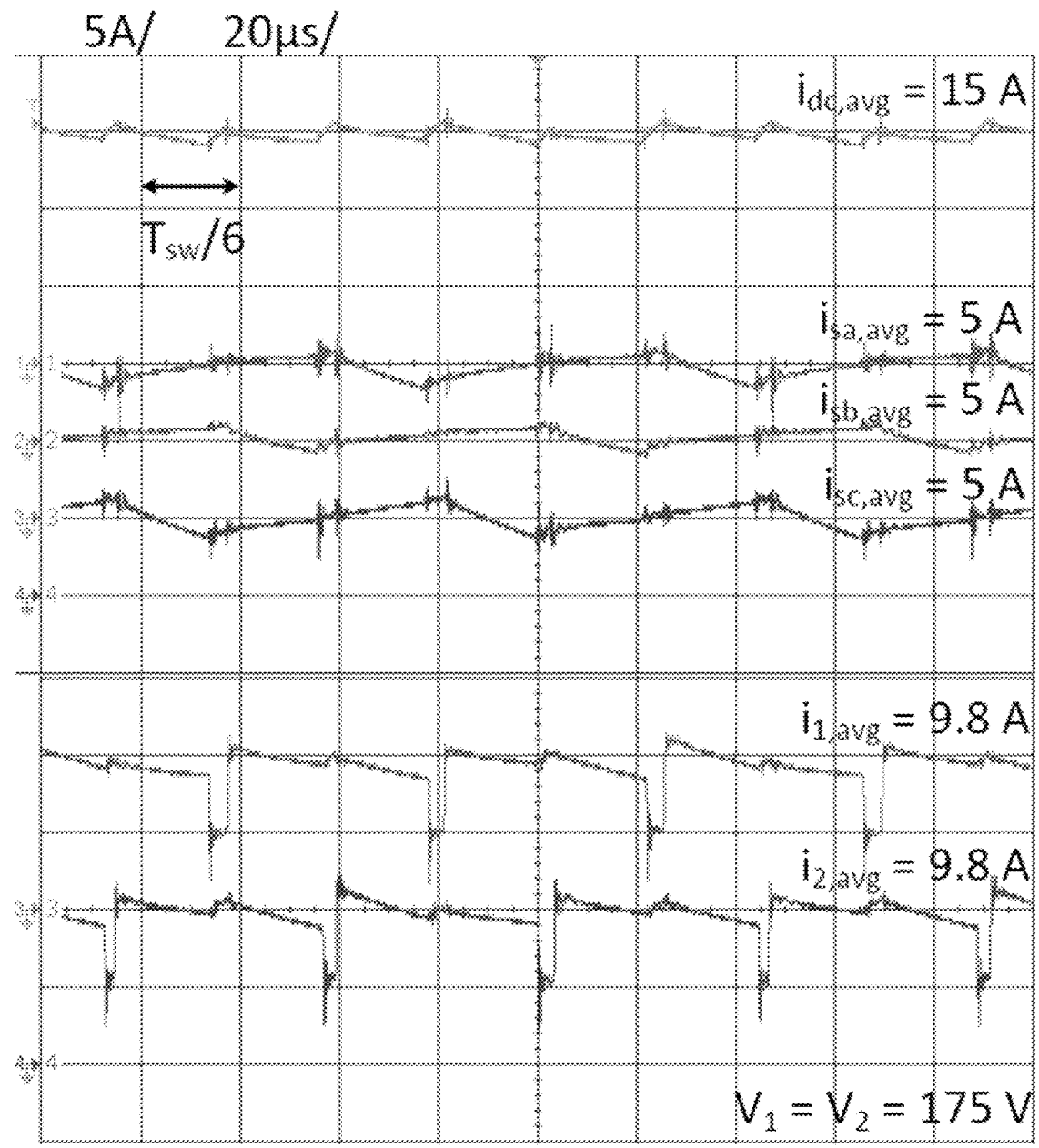
FIGS. 14A and 14B show example experimental results of switching ripple for $i_{dc}$, $i_{s,abc}$, $i_1$, and $i_2$ using the described example switching method.

FIG. 13(b) shows experimental results of constant current control when each supercapacitor voltage exceeds the input voltage. This operating scenario applies to charging EV batteries designed for high-voltage, high-speed operation. The input voltage is fixed at 230 V and each supercapacitor bank charges at 245 V, and the total charging power is also 10.35 KW. The same current steps are applied to this operating point. As shown in FIG. 14(a), the peak-to-peak ripple between phase currents are not identical. Use of a salient-pole rotor leads to asymmetry in flux linkage between stator and rotor, which marginally affects the total inductance per phase.

C. Voltage Balancing

Figure 15:
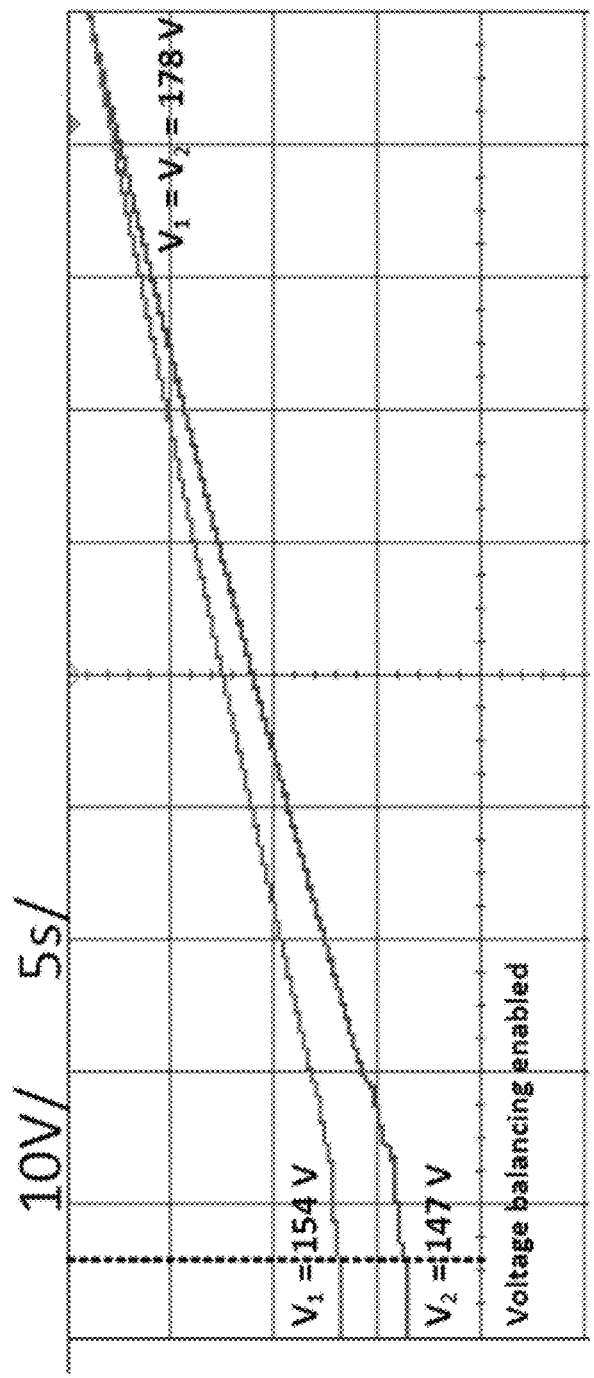
FIG. 15 shows example experimental result of voltage balancing control. Supercapacitor banks are pre-charged with 7V deviation, and controller regulate Δd to achieve voltage balance.

FIG. 15 demonstrates the functionality of voltage balancing control. The supercapacitor voltages prior to charging are 154 V and 147 V. When the controller is enabled, the DC bus current steps from 0 to 10 A, drawing 2.3 KW from the DC supply. Due to the applied offset between d1 and d2, the "undercharged" supercapacitor bank has a faster rate of charge compared to the "overcharged" supercapacitor bank. The supercapacitor voltages converge at approximately 178 V. The results verify operation of the balancing controller in response to the initial voltage deviation.

D. Discussion of Switching Ripple and Rotor Saliency

FIG. 14(a) shows the switching ripple of $i_{dc}$, $i_{s,abc}$, $i_1$, and $i_2$ for case #1, but at lower current reference. This is to show that the magnitude of the peak-to-peak ripple is independent of the average charging current. Neglecting switching noise in the current reference step from FIG. 13(a), the switching ripple between charging at $i_{dc}$=15 A and $i_{dc}$=45 A is identical. Comparing the Fourier spectrum of the simulation and experimental study, the switching ripple at the switching frequency (7.5 kHz) is eliminated in both systems. Any discrepancy between simulation and experimental results is due to differences in operating point, and rotor saliency. For example, output currents $i_1$ and $i_2$ from laboratory results have higher 6th harmonic than 3rd in comparison with simulation results, where the 3rd harmonic is dominant. This is due to the fact that the simulation model is operated at rated conditions. In the experimental work, charging at low currents introduces higher 6th harmonic ripple.

Figure 14B:
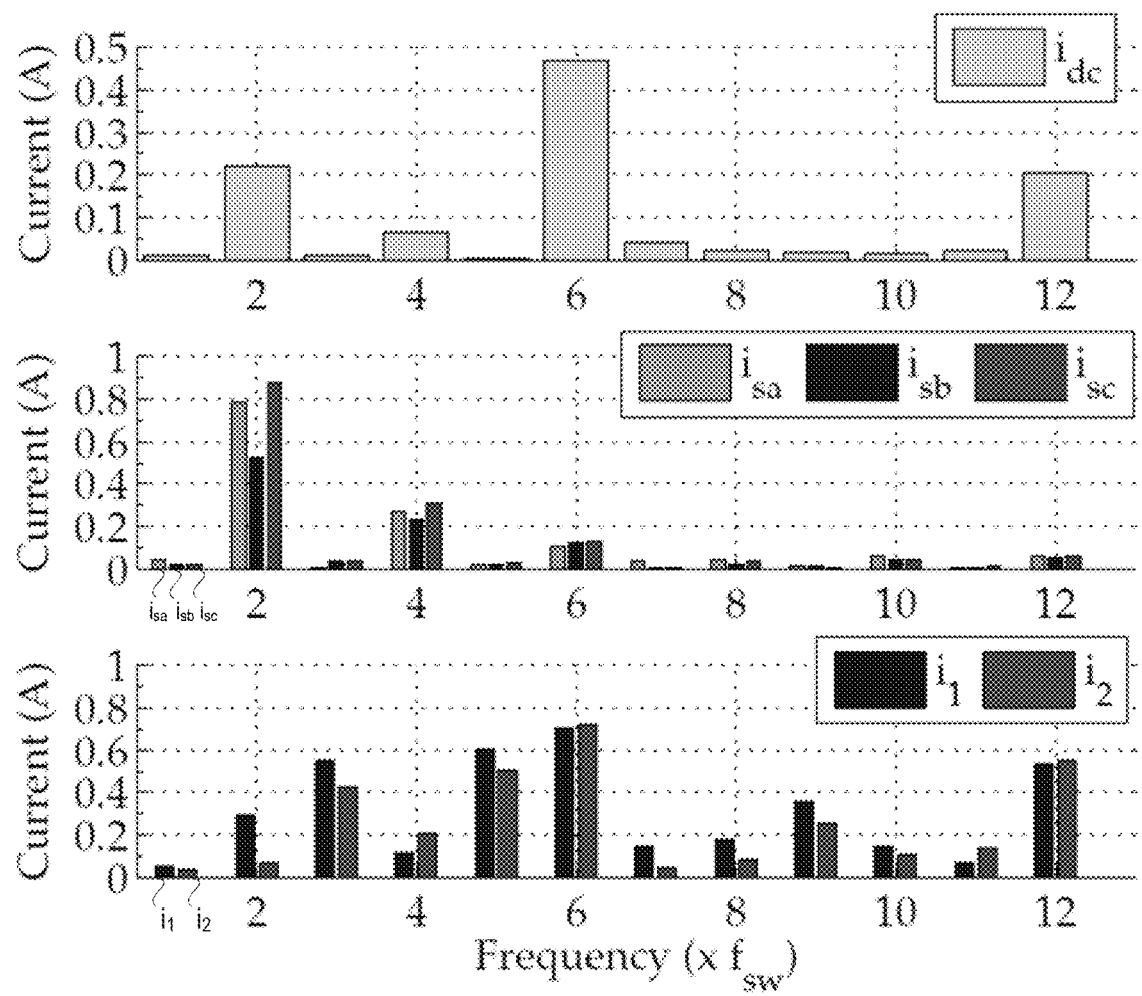

Also note that $i_{sb}$ ripple components in FIG. 14 are noticeably smaller than the other two phases. This results from using a salient-pole rotor, where the phase inductance depends on the rotor's electrical position [7]. In the experimental results, the rotor was arbitrarily oriented to produce the asymmetric phase current ripple in FIG. 14(*a*). In FIG. 14, difference in phase current ripple increases the 2nd harmonic component in $i_{dc}$. However, the 6th harmonic is shown to be the dominant switching component in the input current.

Some embodiments of the present application present a new integrated charger topology that may offer direct charging from the DC grid without any off-board hardware. The concept is to connect the vehicle charging input to the differential ends of the dual traction system. Although a second converter is required, higher motor voltages and lower currents may be utilized, and the net switch VA rating remains unchanged.

In some instances, the proposed integrated charger based on the dual inverter has been demonstrated to enable charging over a wide voltage range. An 11 KW laboratory prototype verifies DC charging for supercapacitor voltages V1 and V2 above and below the DC input voltage. Furthermore, results show effective current control and energy balancing amongst the two supercapacitor banks, which are used in place of batteries to reduce experimental run-time. The proposed switching method may, in some instances, attenuate significant switching harmonics, which is essential for addressing the use of limited motor inductance as interface inductors. The control method for constant voltage charging will be studied in future works. In practice, the proposed topology's charging rate is limited by thermal constraints of the motor and traction power electronics, thus highlighting its ability to charge at the rated power of the traction system ideal for electric vehicle fast charging.

Figure 16:
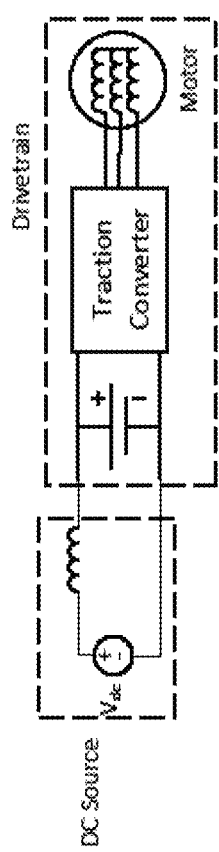
FIG. 16 shows a drivetrain connected directly to a DC charger.

FIG. 16 shows a drivetrain being charged by a DC charger. The DC source is represented by a voltage source with some output impedance. In this architecture, the DC charger is directly connected to the battery of the electric vehicle.

Figure 17:
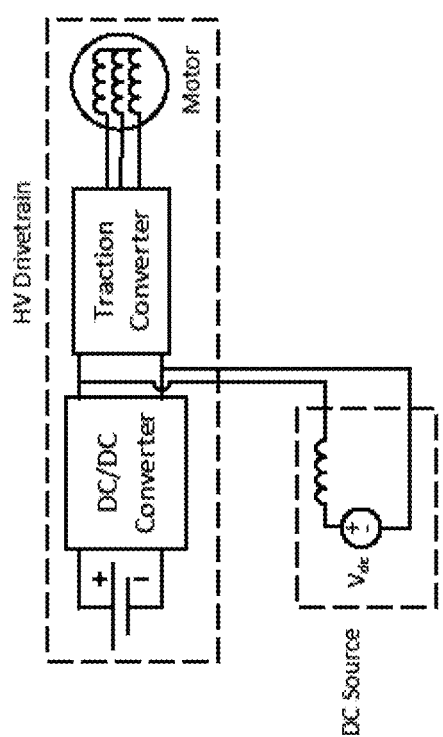
FIG. 17 shows a drivetrain including a DC/DC converter.

FIG. 17 shows another example drivetrain that could be connected to a DC charger. The charger output voltage is not restricted to the battery voltage, but a separate converter is inserted between the battery and DC charger. This does not utilize the drivetrain to charge.

Optional DC Front-End of Some Embodiments

The DC front-end circuit provided below is a component in accordance with a preferred embodiment.

Figure 18:
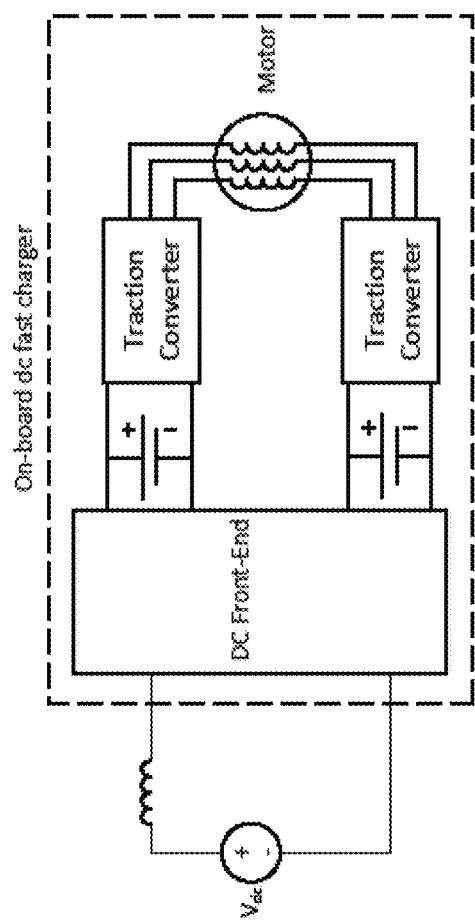
FIG. 18 shows aspects of an example circuit including a DC front-end.

FIG. 18 shows an example system including a front-end circuit connected between the DC source and the traction converters. In some embodiments, the front-end circuit is part of an on-board DC charging circuit/device. In other embodiments, one or more of the front-end circuit components can be part of a DC source circuit. In some embodiments, one or more the front-end circuit components can be split between an on-board charging circuit and a DC charging circuit device which can be connected to the DC charging circuit.

In some embodiments, the system includes a DC front-end stages, and an inverter drive (in the illustrated embodiment, there are two traction converters connected to an open stator motor).

In some embodiments, and front-end circuit and/or the on-board charging circuit is configured to connect to one or more DC sources (e.g. DC microgrids, or DC chargers) to charge an electric vehicle. In the example embodiment shown in FIG. 19, an on-board DC charger includes a dual inverter drive and a DC front-end circuit. In some instances, the DC front-end is configured to interface the dual inverter drive to a DC source or network to enable charging of the electric vehicle (EV). In some embodiments, the DC front-end and dual inverter drive work in conjunction to achieve DC charging that is above and below the voltage of both batteries in the system combined.

The DC front-end is composed of one or more switching devices and/or passive components to facilitate the up and/or down conversion of input voltage to the batteries in conjunction with the dual inverter.

In some embodiments, the DC front-end circuit includes a switching device controllable in conjunction with switches in one or more inverter circuits based on voltages of one or more batteries corresponding to the inverter circuits.

Figure 19:
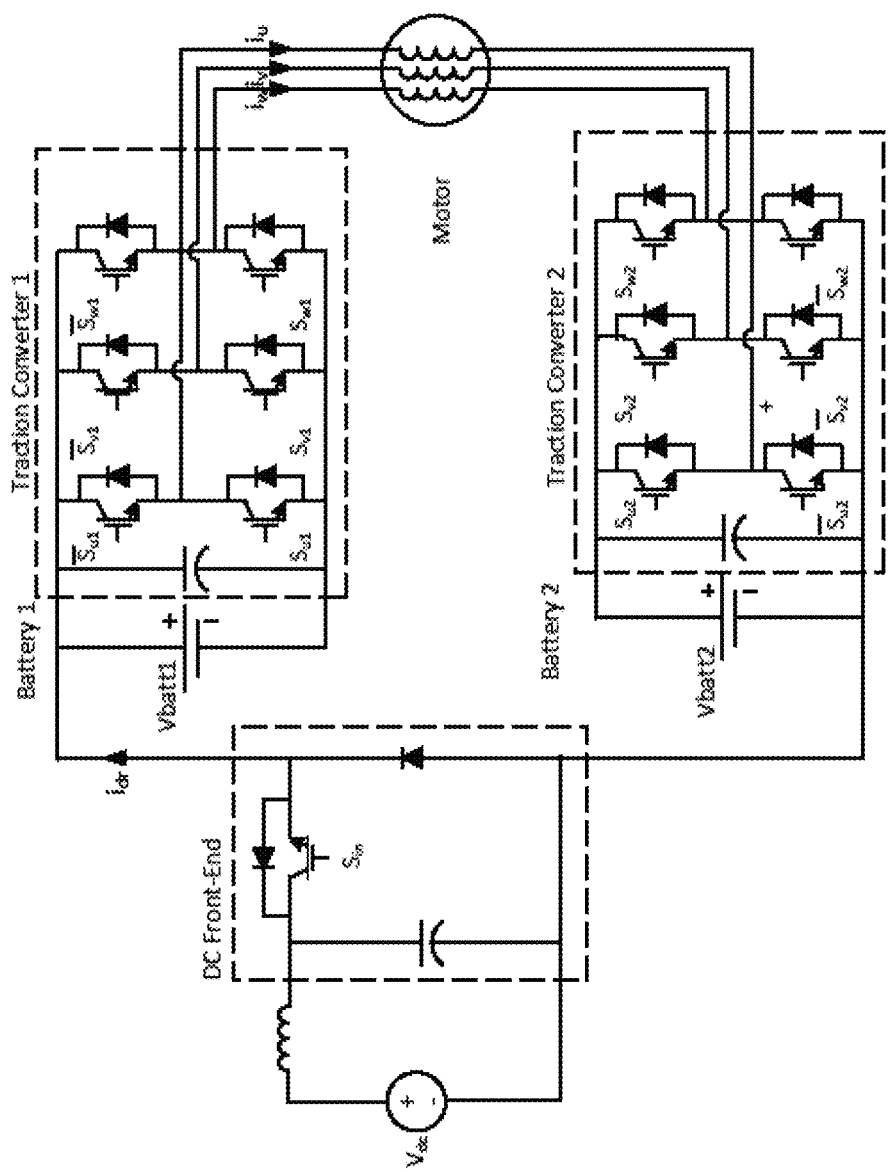
FIG. 19 shows aspects of an example circuit having dual inverters and showing example components of a DC front-end.

In some embodiments, such as the example circuit in FIG. 19, the front-end switching circuit is configured to control the charging input from the DC source to two inverter circuits (e.g. Traction Converter 1 and Traction Converter 2, which correspond to Battery 1 and Battery 2 respectively). In FIG. 19, the dual inverter drive includes two multiphase voltage source converters connected to an open-ended motor.

In some embodiments, the front-end circuit includes a capacitor and a diode in parallel with one or more inverter(s) in the charging circuit.

In some embodiments, the system (whether part of the front-end circuit, an inverter circuit, or elsewhere) can include one or more controllers configured to control the switching device in the front-end circuit in conjunction with the switches in the inverter circuit(s).

In some embodiments, the DC front-end includes a switching device. In some embodiments, the switching device is an active switch. In some embodiments, the switching device can be a MOSFET (metal oxide semiconductor field-effect transistor) or IGBT (insulated-gate bipolar transistor). Other suitable switching devices can also be used.

In different embodiments, the front-end circuit can include other suitable combinations and/or arrangements of capacitors and/or inductors placed in series with active switching devices.

In some embodiments, the front-end circuit can include multiple active switching devices.

For some embodiments of FIG. 18, the dual inverter and DC front-end may be realized with an IGBT, diode, and capacitor as shown in FIG. 19.

The following description is one method of operating the embodiment as shown in FIG. 19. Operation can be divided into two cases, which are $$V_{batt1} + V_{batt2} \le V_{dc} \quad \text{Case 1}$$

$$V_{batt1} + V_{batt2} > V_{dc} \quad \text{Case 2}$$

In Case 1, in some embodiments, the dual inverter drive is switched such that Su1, Sv1, Sw1, Su2, Sv2, and Sw2 are on. This inserts both battery 1 and battery 2 into the circuit path. The DC front-end is used to regulate the current of the motor by modulating switch Sin. By doing this, the charger may charge from dc voltage sources which are greater than the sum of both battery voltages.

In some embodiments, Case 1 and/or Case 2 may require a margin voltage to be overcome before the circuit can charge effectively. e.g.

$$V_{batt1} + V_{batt2} + V_{margin} \le V_{dc} \quad \text{Case 1}$$

$$V_{batt1} + V_{batt2} + V_{margin} > V_{dc} \quad \text{Case 2}$$

In Case 2, the dual inverter drive is used to regulate the current of the motor by modulating its switches and the DC front-end turns switch Sin on. By doing this, the charger may charge from dc voltage sources, which are less than the sum of both battery voltages.

In other embodiments, an alternative or additional mode of operation could have traction converter 1 and 2 regulating the current, evenly in each phase, of the motor while $S_{in}$ is switched on some percentage of the time (i.e. operated at an appropriate duty cycle. The duty cycle must be equal to or below $(V_{batt1}+V_{batt2})/V_{dc}$ in the case of the embodiment shown in FIG. 19).

For example, in case 1, $S_{in}$ is on, while the rest of the switches are switched or modulated. In case 2, $S_{in}$ is off, while the rest of the switches are not modulated.

In other embodiments, any combination of switching or modulations schemes can be applied to enable charging based on different battery voltages relative to the input voltage.

In some embodiments, one traction inverter can always be switched in or out, and the other transaction invertor can switch with $S_{in}$ being on or modulated.

In another embodiment, bidirectional operation (i.e. power transfer from the EV to the DC source or network is possible if the diode of FIG. 19 is replaced with an active switch (e.g. MOSFTET/IGBT).

In some situation, this system may offer flexibility in charging from DC sources or networks to enable charging at the fastest rate available to the vehicle. For comparison, other DC chargers connect directly to the EV battery. The EV is then able to draw the charger's maximum output current, but the output voltage of charger is fixed by the battery.

In some situations, the circuits utilizing a front-end circuit can make the output voltage of the charger independent of the battery, which may allow the EV to charge at the maximum output power of the DC charger.

Current standards allow for charging up to 1000V whereas most systems today charge at approximately 400V. As the embodiment can accommodate charging above and below its battery voltages, it is compatible with both.

The major benefits of the embodiment are as follows:

In some situations, some example systems described herein may enable re-deployment of drivetrain components for the purposes of DC fast charging when the vehicle is stationary.

In some situations, some example systems described herein may enable charging at highest available charging rate by decoupling the charger from the battery. The EV can be connected to chargers that output voltages above or below the sum voltages of the batteries.

In some situations, some example on-board DC fast chargers described herein can be directly connected to a DC network (i.e. DC microgrid) for charging, but can be also compatible with EV DC fast chargers.

In some situations, charging rates enabled by the on-board charger scales with the drivetrain, which typically have higher power ratings.

In some situations, bidirectional operation may be achievable for DC network support. Thus, the EV can work as a back-up power source, or temporary storage for solar power.

In some situations, The DC charging circuit features fault blocking capability at the DC source, thereby protecting the first battery and second battery in the event of a DC-side fault. This is achieved by turning off gating signals to the first inverter module and second inverter module during a fault. This is an important feature of a preferred embodiment. An improved gating signal controller, in some embodiments, provides the control signals for turning off the gating signals to the first inverter module.

Figure 20:
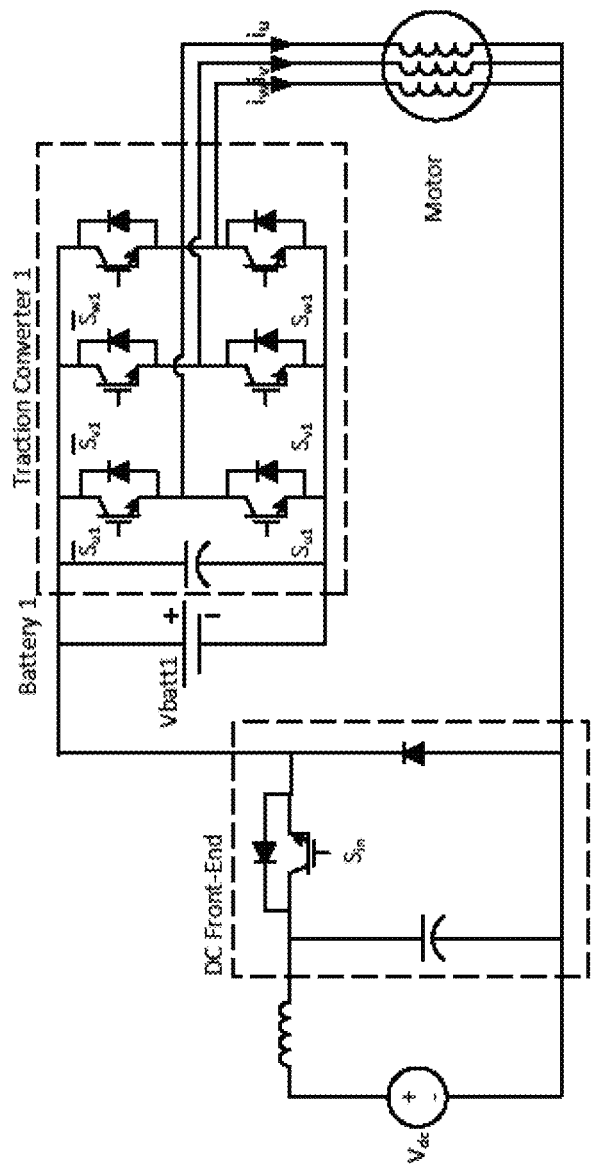
FIG. 20 shows aspects of an example circuit having a single inverter.

As illustrated in FIG. 20 and described herein or otherwise, in some embodiments, the front-end circuit can be applied to a single traction inverter. Once again, the system can be divided into the drivetrain with a DC front-end. The depicted motor is an open-ended stator just as in FIG. 19, but a motor with an accessible neutral point may be used as well.

Figure 21:
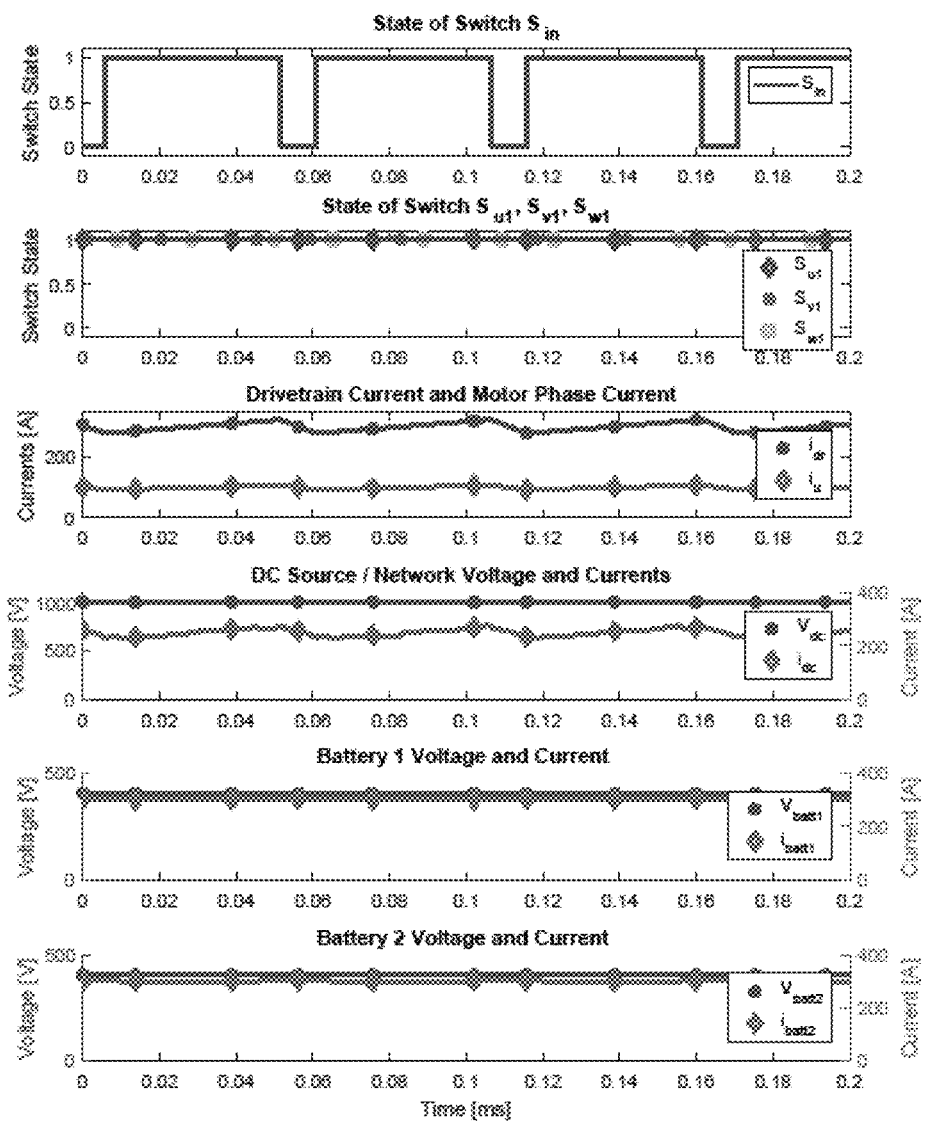
FIG. 21 is shows example switch states and resulting currents and voltages when operating in a first mode.

FIG. 21 shows the switch state of switch Sin for the operational mode for when Vdc>Vbatt1+Vbatt2 (e.g. case 1). In this example, operational mode, switch Sin is modulated to control the drivetrain current.

The first graph shows the switch state of switch Sin. Switch Sin is modulated to control the drivetrain current.

The second graph shows that switches Su1, Sv1, and Sw1 are all gated on to fully insert battery1 into the system. This is also true for switches Su2, Sv2, and Sw2.

The third graph shows the drivetrain current idr as indicated in FIG. 19. It is regulated by using Sin. In this case, 300 A is regulated. As the motor is designed to be symmetric, the current in the motor is split substantially equally between all three phases of the motor.

The fourth graph shows the dc source/network voltage and current. Power is being transferred into the EV.

The fifth graph shows battery 1 voltage and current, showing that power is being transferred into battery 1.

The sixth graph shows battery 2 voltage and current, showing that power is being transferred into battery 2.

Figure 22:
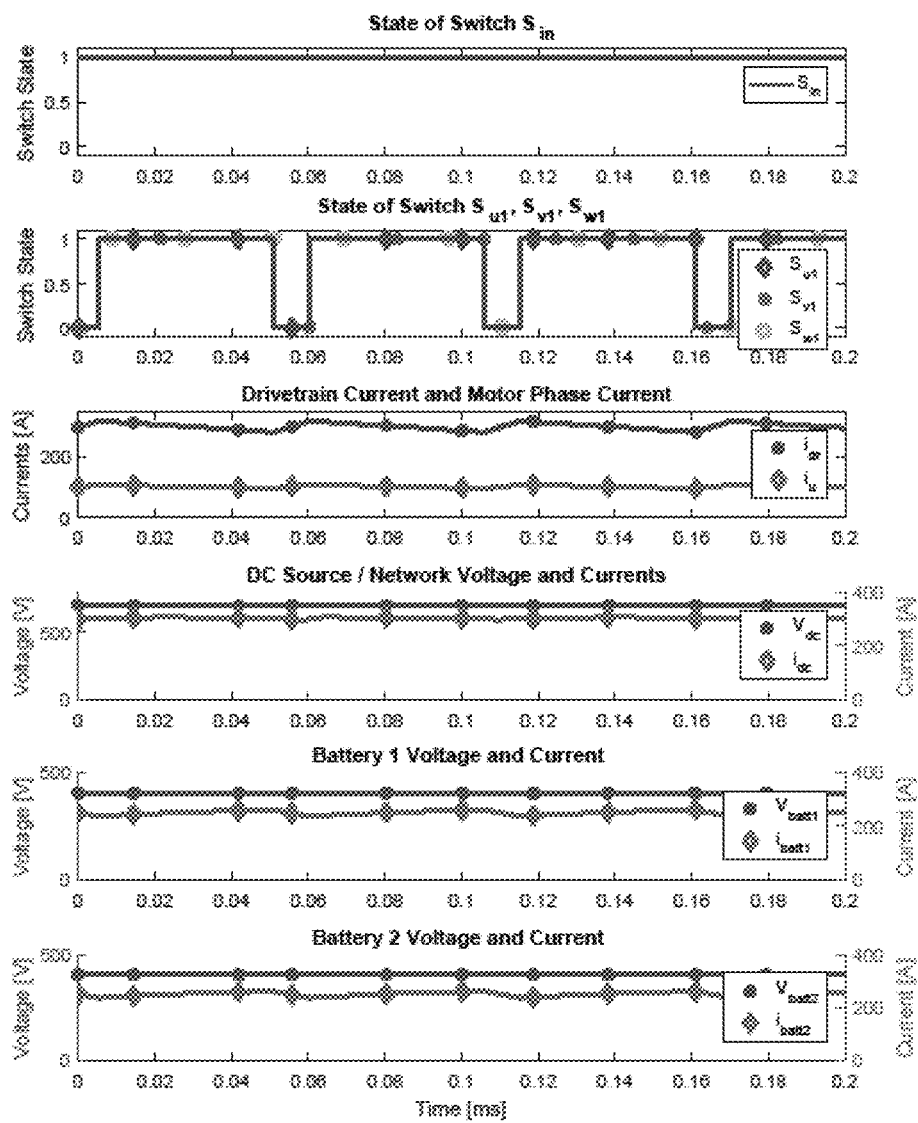
FIG. 22 is shows example switch states and resulting currents and voltages when operating in a second mode.

FIG. 22 shows the switch state of switch Sin for the operational mode for when Vdc<=Vbatt1+Vbatt2 (e.g. case 2). In this example, operational mode, switch Sin is gated on while the traction converters are modulated to control the drivetrain current.

The first graph shows the switch state of switch Sin. Switch Sin is always gated on.

The second graph shows that switches Su1, Sv1, and Sw1 are all gated to control the current in each phase of the motor. This is also true for switches Su2, Sv2, and Sw2. In this diagram, all phases are switched at approximately the same time. Additional interleaved modulation techniques can be used to shift the switching times to reduce ripple current on idr, but still regulate the current of each phase. The third graph shows the drivetrain current idr as indicated in FIG. 2. It is regulated by using traction converter 1 and 2 by gating Su1, Sv1, Sw1, Su2, Sv2, Sw2. In this case, 300 A is regulated.

The fourth graph shows the dc source/network voltage and current. Power is being transferred into the EV.

The fifth graph shows battery 1 voltage and current, showing that power is being transferred into battery 1.

The sixth graph shows battery 2 voltage and current, showing that power is being transferred into battery 2.

REFERENCES

[1] R. Schmidt, "Information technology energy usage and our planet," in 11*th Intersociety Conf. on Thermal and Thermomechanical Phenomena in Electronic Systems*, vol., no., pp. 1255-1275, 28-31 May 2008.

[2] M. Yilmaz and P. T. Krein, "Review of charging power levels and infrastructure for plug-in electric and hybrid vehicles," 2012 *IEEE International Electric Vehicle Conference (IEVC)*, Greenville, S C, 2012, pp. 1-8.

[3] *Electric Vehicle Conductive Charging System Part 23: DC Electric Vehicle Charging System*, IEC 61851-23, 2014.

[4] M. Smith, J. Castellano, "Costs Associated With Non-Residential Electric Vehicle Supply Equipment—Factors to consider in the implementation of electric vehicle charging stations," U.S. Department of Energy Vehicle Technologies Office, November 2015.

[5] I. Subotic, E. Levi, M. Jones and D. Graovac, "On-board integrated battery chargers for electric vehicles using nine-phase machines," 2013 *International Electric Machines & Drives Conference*, Chicago, I L, 2013, pp. 226-233.

[6] I. Subotic, N. Bodo, E. Levi, B. Dumnic, D. Milicevic and V. Katic, "Overview of fast on-board integrated battery chargers for electric vehicles based on multiphase machines and power electronics," in *IET Electric Power Applications*, vol. 10, no. 3, pp. 217-229, 3 2016.

[7] G. Pellegrino, E. Armando and P. Guglielmi, "An Integral Battery Charger With Power Factor Correction for Electric Scooter," in *IEEE Transactions on Power Electronics*, vol. 25, no. 3, pp. 751-759, March 2010.

[8] Lixin Tang and G. J. Su, "A low-cost, digitally-controlled charger for plug-in hybrid electric vehicles," 2009 *IEEE Energy Conversion Congress and Exposition*, San Jose, CA, 2009, pp. 3923-3929.

[9] K. Shenai and K. Shah, "Smart DC micro-grid for efficient utilization of distributed renewable energy," *IEEE* 2011 *EnergyTech*, Cleveland, O H, 2011, pp. 1-6.

[10] D. M. Vilathgamuwa, S. D. G. Jayasinghe, F. C. Lee, U. K. Madawala, "A unique battery/supercapacitor direct integration scheme for hybrid electric vehicles," in *IECON* 2011-37*th Annual Conference on IEEE Industrial Electronics Society*, vol., no., pp. 3020-3025, 7-10 Nov. 2011.

[11] D. Casadei, G. Grandi, A. Lega; C. Rossi, "Multilevel Operation and Input Power Balancing for a Dual Two-Level Inverter with Insulated DC Sources," *IEEE Trans. on Ind. Applicat.*, vol. 44, no. 6, pp. 1815-1824, November-December 2008.

[12] Y. Lee and J. I. Ha, "Hybrid Modulation of Dual Inverter for Open-End Permanent Magnet Synchronous Motor," in *IEEE Transactions on Power Electronics*, vol. 30, no. 6, pp. 3286-3299, June 2015.

[13] Junha Kim, Jinhwan Jung and Kwanghee Nam, "Dual-inverter control strategy for high-speed operation of EV induction motors," in *IEEE Transactions on Industrial Electronics*, vol. 51, no. 2, pp. 312-320, April 2004.

[14] R. U. Haque, A. Kowal, J. Ewanchuk, A. Knight and J. Salmon, "PWM control of a dual inverter drive using an open-ended winding induction motor," 2013 *IEEE* 28*th Annual Applied Power Electronics Conference and Exposition (APEC)*, Long Beach, CA, USA, 2013, pp. 150-156.

[15] S. Lu, K. A. Corzine and M. Ferdowsi, "A Unique Ultracapacitor Direct Integration Scheme in Multilevel Motor Drives for Large Vehicle Propulsion," in *IEEE Transactions on Vehicular Technology*, vol. 56, no. 4, pp. 1506-1515, July 2007.

[16] J. Hong, H. Lee and K. Nam, "Charging Method for the Secondary Battery in Dual-Inverter Drive Systems for Electric Vehicles," in *IEEE Transactions on Power Electronics*, vol. 30, no. 2, pp. 909-921, February 2015.

[17] *Plugs, socket-outlets, vehicle connectors and vehicle inlets-Conductive charging of electric vehicles Part 3: Dimensional compatibility and interchangeability requirements for d.c. and a.c./d.c. pin and contact-tube vehicle couplers*, IEC 62196-3, 2014.

[18] Yuanzheng Han, M. Ranjram, P. W. Lehn, "A bidirectional multi-port DC-DC converter with reduced filter requirements," in 2015 *IEEE* 16*th Workshop on Control and Modeling for Power Electronics (COMPEL)*, vol., no., pp. 1-6, 12-15 Jul. 2015.

[19] G. J. Kish, C. Holmes and P. W. Lehn, "Dynamic modeling of modular multilevel DC/DC converters for HVDC systems," 2014 *IEEE* 15*th Workshop on Control and Modeling for Power Electronics (COMPEL)*, Santander, 2014, pp. 1-7.

[20] H. B¨ an arnklau, A. Gensior and S. Bernet, "Derivation of equivalent submodule per arm for modular multilevel converters," 2012 15*th International Power Electronics and Motion Control Conference (EPE/PEMC)*, Novi Sad, 2012, pp. LS2a.2-1-LS2a.2-5.

[21] Siang Fui Tie and Chee Wei Tan, "A review of energy sources and energy management system in electric vehicles," *Renewable and Sustainable Energy Reviews*, Volume 20, Pages 82-102, April 2013.

[22] Clark G. Hochgraf, John K. Basco, Theodore P. Bohn, Ira Bloom, "Effect of ultracapacitor-modified PHEV protocol on performance degradation in lithium-ion cells," *Journal of Power Sources*, vol. 246, pp. 965-969, Jan. 15, 2014

[23] *IEEE Standard Technical Specifications of a DC Quick Charger for Use with Electric Vehicles*, IEEE Std. 2030.1.1, 2015.

What is claimed is:

1. A front-end switching circuit for controlling charging input from at least one DC power source to at least a first inverter circuit and a second inverter circuit, the first inverter circuit corresponding to at least a first battery and the second inverter circuit corresponding to at least a second battery, the front-end switching circuit comprising:

at least one switching device which when electrically coupled with the first inverter circuit, the second inverter circuit and the at least one DC source, the at least one switching device is configured to control the charging input provided to at least one of the first and the second batteries, the at least one switching device controllable in conjunction with switches in at least one of the first inverter circuit and the second inverter circuit based on at least one voltage of at least one of the first and the second batteries.

2. The front-end switching circuit of claim 1,
wherein when a sum of the voltages of the first battery and the second battery are less than an input voltage of the DC source, the at least one switching device is configured to control the charging input by operating in a first mode; and
when the sum of the voltages of the first battery and the second battery are greater than the input voltage of the DC source, the at least one switching device is configured to control the charging input by operating in a second mode.

3. The front-end switching circuit of claim 2, wherein in the first mode, the at least one switching device is modulated while switches in the first and second inverter circuits are switched on, enabling charging of the first and second battery.

4. The front-end switching circuit of claim 2, wherein in the first mode, the at least one switching device is on while switches in the first and second inverter circuits are modulated enabling charging of the first and second battery.

5. The front-end switching circuit of claim 2, wherein in the first mode, the at least one switching device is modulated with a duty cycle equal to or less than the sum of the voltages of the first battery and the second battery divided by the input voltage of the DC source.

6. The front-end switching circuit of claim 2, wherein in the second mode, the at least one switching device is on while switches in the first and second inverter circuits are modulated enabling charging of the first and second battery.

7. The front-end switching circuit of claim 1, wherein the at least one switching device has bi-directional current conduction and uni-polar voltage blocking capability.

8. The front-end switching circuit of claim 1, wherein the DC front-end switching circuit comprises an input filter, and a device like a diode that has uni-directional current conducting and uni-polar voltage blocking capability in parallel with at least one of the first and second inverter circuits.

9. The front-end switching circuit of claim 1, comprising a controller configured to generate signals for controlling the at least one switching device in conjunction with switches in at least one of the first and second inverter circuits.

10. The front-end switching circuit of claim 1, wherein the DC front-end switching circuit includes a fault blocking circuit at the DC power source for protecting at least one of the first and second batteries in an event of a DC-side fault.

11. A method for controlling charging input from a DC power source to at least a first inverter circuit and a second inverter circuit, using a front-end switching circuit, the first-inverter circuit corresponding to at least a first battery and the second inverter circuit corresponding to at least a second battery, the method comprising:
controlling, using at least one switching device of the front-end switching circuit, the charging input provided to at least one of the first battery and the second battery, the at least one switching device controllable in conjunction with switches in at least one of the first inverter circuit and the second inverter circuit based on at least one voltage of at least one of the first battery and the second battery.

12. The method of claim 11,
wherein when a sum of the voltages of the first battery and the second battery are less than an input voltage of the DC source, the at least one switching device is configured to control the charging input by operating in a first mode; and
when the sum of the voltages of the first battery and the second battery are greater than the input voltage of the DC source, the at least one switching device is configured to control the charging input by operating in a second mode.

13. The method of claim 12, wherein in the first mode, the at least one switching device is modulated while switches in the first and second inverter circuits are switched on, enabling charging of the first and second battery.

14. The method of claim 12, wherein in the first mode, the at least one switching device is on while switches in the first and second inverter circuits are modulated enabling charging of the first and second battery.

15. The method of claim 12, wherein in the first mode, the at least one switching device is modulated with a duty cycle equal to or less than the sum of the voltages of the first battery and the second battery divided by the input voltage of the DC source.

16. The method of claim 12, wherein in the second mode, the at least one switching device is on while switches in the first and second inverter circuits are modulated enabling charging of the first and second battery.

17. The method of claim 11, wherein the at least one switching device has bi-directional current conduction and uni-polar voltage blocking capability.

18. The method of claim 11, wherein the front-end switching circuit comprises an input filter, and a device like a diode that has uni-directional current conducting and uni-polar voltage blocking capability in parallel with at least one of the first and second inverter circuits.

19. The method of claim 11, comprising generating, by a controller, signals for controlling the at least one switching device in conjunction with switches in at least one of the first and second inverter circuits.

20. A non-transitory machine readable medium, storing machine interpretable instructions, which when executed by a processor, causes the processor to perform a method for controlling charging input from a DC power source to at least a first inverter circuit and a second inverter circuit, using a front-end switching circuit, the first inverter circuit corresponding to at least a first battery and the second inverter circuit corresponding to at least a second battery, the method comprising:
controlling, using at least one switching device of the front-end switching circuit, which when electrically coupled with the first inverter circuit, the second inverter circuit and the DC source, the charging input provided to at least one of the first battery and the second battery, the at least one switching device controllable in conjunction with switches in at least one of the first inverter circuit and the second inverter circuit based on at least one voltage of at least one of the first and the second battery.

* * * * *